(12) United States Patent
Morishima et al.

(10) Patent No.: US 12,024,222 B2
(45) Date of Patent: Jul. 2, 2024

(54) STEERING DEVICE

(71) Applicant: NSK Ltd., Tokyo (JP)

(72) Inventors: Tomonori Morishima, Gunma (JP); Tasuku Oishi, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/265,848

(22) PCT Filed: Dec. 9, 2021

(86) PCT No.: PCT/JP2021/045279
§ 371 (c)(1),
(2) Date: Jun. 7, 2023

(87) PCT Pub. No.: WO2022/138191
PCT Pub. Date: Jun. 30, 2022

(65) Prior Publication Data
US 2024/0059344 A1    Feb. 22, 2024

(30) Foreign Application Priority Data

Dec. 24, 2020   (JP) .................................. 2020-215544

(51) Int. Cl.
*B62D 1/19*     (2006.01)
*B62D 1/189*    (2006.01)

(52) U.S. Cl.
CPC ............. *B62D 1/195* (2013.01); *B62D 1/189* (2013.01)

(58) Field of Classification Search
CPC ........ B62D 1/195; B62D 1/189; B62D 1/185; B62D 1/184
See application file for complete search history.

(56) References Cited

U.S. PATENT DOCUMENTS

2019/0106142 A1*    4/2019  Fricke .................... B62D 1/189

FOREIGN PATENT DOCUMENTS

| JP | 09-272446 A | 10/1997 |
|----|-------------|---------|
| JP | 2017-035999 A | 2/2017 |

(Continued)

OTHER PUBLICATIONS

International Search Report of PCT/JP2021/045279 dated Jan. 18, 2022 [PCT/ISA/210].

*Primary Examiner* — Drew J Brown
(74) *Attorney, Agent, or Firm* — Sughrue Mion, PLLC

(57) ABSTRACT

A steering device includes an input shaft coupled to a steering wheel and extending in an axial direction, an output shaft fitted to the input shaft and capable of relatively moving in the axial direction with respect to the input shaft, an upper column having a cylindrical shape that is disposed on a radially outer side of the input shaft and rotatably supports the input shaft, a lower column having a cylindrical shape that is fitted to the upper column and capable of relatively moving in the axial direction with respect to the upper column, a column bracket that includes a side plate portion located on the side of the upper column and is detachable from a vehicle body, a support member provided on the upper column, and a pin that is provided to extend along the radial direction and penetrate through the side plate portion and the support member. The support member includes a through-hole through which the pin penetrates, a long hole extending from the through-hole toward the steering wheel, and a stopper positioned between the through-hole and the long hole and supporting the pin.

5 Claims, 15 Drawing Sheets

(56) References Cited

FOREIGN PATENT DOCUMENTS

| JP | 2017185987 A | * | 10/2017 | ........... B60R 25/021 |
| JP | 2019043219 A | * | 3/2019 | ............. B62D 1/184 |
| KR | 10-2016-0053160 A | | 5/2016 | |
| KR | 10-2016-0070198 A | | 6/2016 | |

* cited by examiner

STEERING DEVICE

CROSS REFERENCE TO RELATED APPLICATIONS

This application is a National Stage of International Application No. PCT/JP2021/045279 filed on Dec. 9, 2021, claiming priority based on Japanese Patent Application No. 2020-215544 filed on Dec. 24, 2020.

FIELD

The present disclosure relates to a steering device.

BACKGROUND

A steering device includes a steering shaft coupled to a steering wheel and extending in an axial direction, and a steering column supported on an outer peripheral side of the steering shaft. Patent Literature 1 discloses a tilt-type steering device for changing the height of a steering wheel according to the driver's physique, driving posture, and the like.

CITATION LIST

Patent Literature

Patent Literature 1: JP H09-272446 A

SUMMARY

Technical Problem

Incidentally, when the vehicle causes a collision and a secondary collision in which the driver hits the steering wheel, the column bracket supporting the steering column moves to the front side of the vehicle body, and thus, it is necessary to leave a space portion on the front side of the column bracket. For this reason, it may be difficult to dispose a component in the space portion on the front side of the column bracket.

The present disclosure has been made in view of the above problem, and an object is to provide a steering device capable of further reducing a movement amount of a column bracket at the time of a secondary collision.

Solution to Problem

To achieve the above object, a steering device according to an embodiment of the present disclosure comprising: a steering shaft that is coupled to a steering wheel and extends in an axial direction; an upper column having a cylindrical shape that is disposed on a radially outer side of the steering shaft; a lower column having a cylindrical shape that is fitted to the upper column and is capable of relatively moving in an axial direction with respect to the upper column; a column bracket that includes a side plate portion located on a side of the upper column and is detachable from a vehicle body at a time of collision; a support member that is provided on the upper column; and a pin that extends along a vehicle width direction and penetrates the side plate portion and the support member, wherein the support member includes a through-hole through which the pin penetrates, a long hole extending from the through-hole toward the steering wheel, and a stopper positioned between the through-hole and the long hole, and the pin hits the stopper at a time of collision, and the stopper is deformed, so that the pin is movable from the through-hole to the long hole.

When the driver hits the steering wheel at the time of the secondary collision, a force to the front side is transmitted to the upper column via the input shaft of the steering shaft. Since the upper column is provided with a support member, the support member moves forward relative to the pin. Specifically, when the support member moves forward, the stopper is damaged by the pin, and the pin relatively moves in a long hole of the support member. Then, when the pin hits the end portion of the edge of the long hole, next the pin pushes a side plate portion forward, so that the column bracket is detached from the vehicle body. Thereafter, the upper column and the column bracket move forward. As described above, according to the present disclosure, at the time of the secondary collision, the forward movement amount of the column bracket is reduced by the distance over which the pin moves in the long hole of the support member while maintaining the energy absorbing capability due to the relative movement of the upper column and the lower column. Accordingly, the space portion on the front side of the column bracket after the secondary collision becomes larger, and more components or a larger component can be disposed in the space portion on the front side of the column bracket.

As a desirable embodiment of the steering device, the upper column includes a column long hole extending along an axial direction, and the support member is disposed in the column long hole. Thus, when the support member is mounted on the column bracket, the specification does not have the telescopic function, and when the support member is removed from the column bracket, the specification has the telescopic function.

As described above, the telescopic specification and the specification not having the telescopic function can be applied to the same column bracket, and component sharing can be achieved.

As a desirable embodiment of the steering device, the support member is detachably provided on the upper column.

In this manner, by attaching and detaching the support member to and from the upper column, it is possible to easily switch between the telescopic specification and the specification not having the telescopic function.

As a desirable embodiment of the steering device, the stopper is a protrusion.

By appropriately changing the height of a protrusion, it is possible to easily adjust the magnitude of a load that the pin gets over the protrusion and enters the long hole.

As a desirable embodiment of the steering device, the side plate portion includes a tilt long hole extending in a direction intersecting an extending direction of the long hole, and the pin penetrates the tilt long hole.

Thus, the height of the steering wheel can be changed according to the driver's physique, driving posture, and the like.

Advantageous Effects of Invention

With the steering device of the present disclosure, the forward movement amount of the column bracket is reduced at the time of the secondary collision.

DESCRIPTION OF EMBODIMENTS

Hereinafter, the present invention will be described in detail with reference to the drawings. Note that the present invention is not limited by a mode for carrying out the invention described below (hereinafter, referred to as an embodiment). In addition, constituent elements in the embodiment described below include those that can be easily assumed by those skilled in the art, those that are substantially the same, and those within a so-called equivalent range. Further, the constituent elements disclosed in the embodiment described below can be appropriately combined. Note that, in the description described below, a direction along a rotation axis Ax of a steering shaft 3 is referred to as an axial direction, and a direction intersecting the rotation axis Ax (for example, a direction orthogonal to the rotation axis Ax) is referred to as a radial direction. In addition, the front side in the vehicle body is denoted by FR, the rear side in the vehicle body is denoted by RR, the right side in the vehicle body is denoted by RH, and the left side in the vehicle body is denoted by LH.

EMBODIMENT

Figure 1:
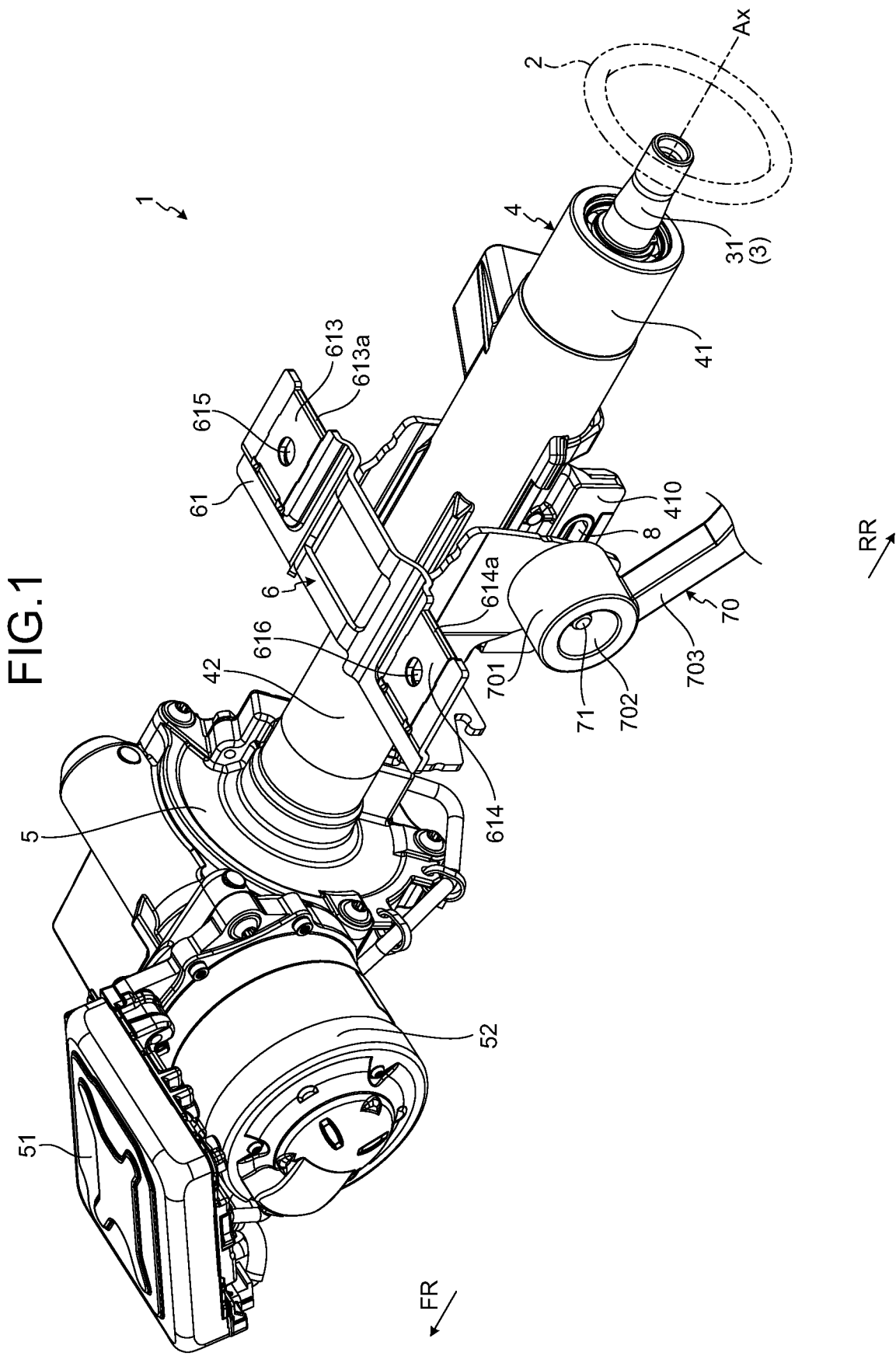
FIG. 1 is a perspective diagram of a steering device according to an embodiment.
Figure 2:
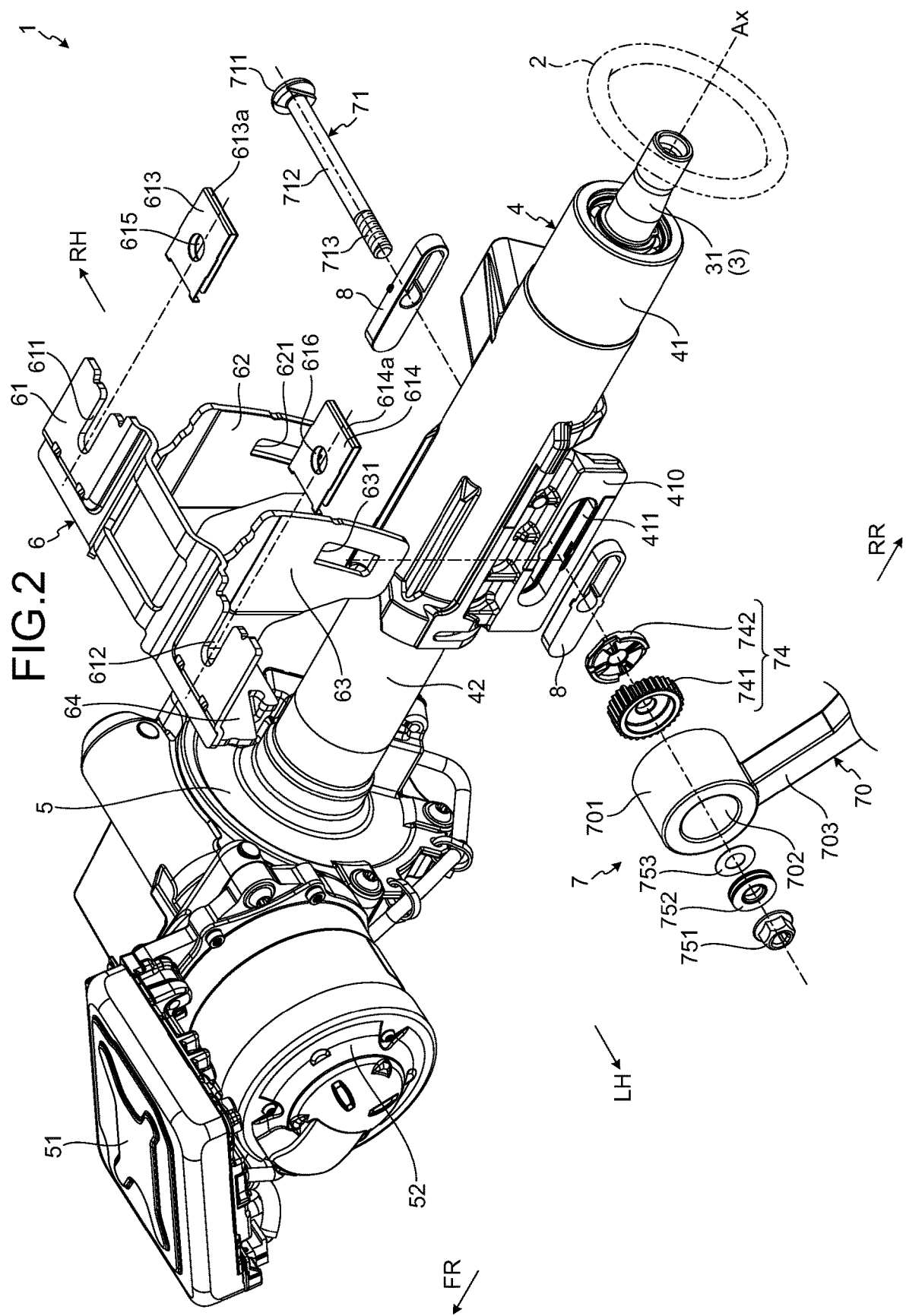
FIG. 2 is an exploded perspective diagram of the steering device of FIG. 1.
Figure 3:
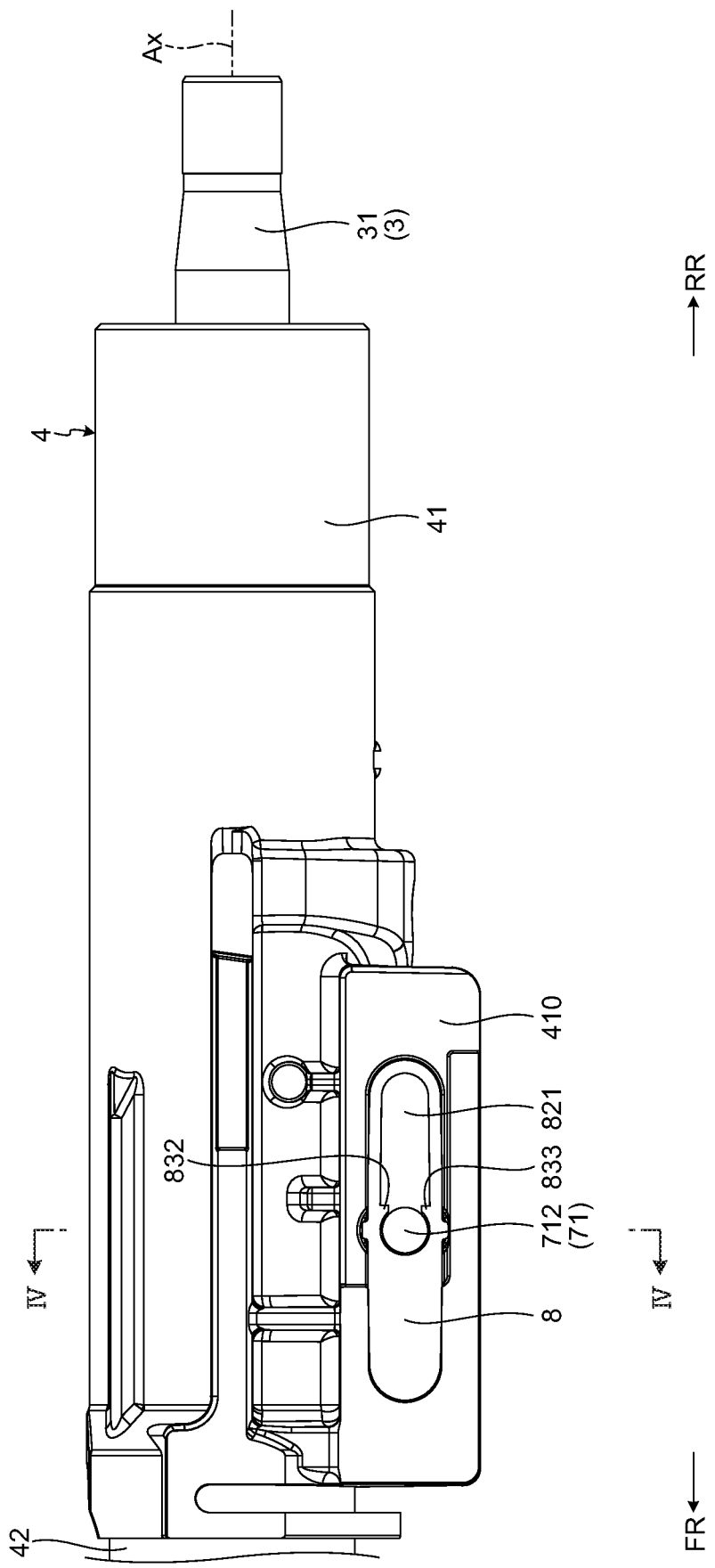
FIG. 3 is a side diagram of a part of the steering device of FIG. 1.
Figure 4:
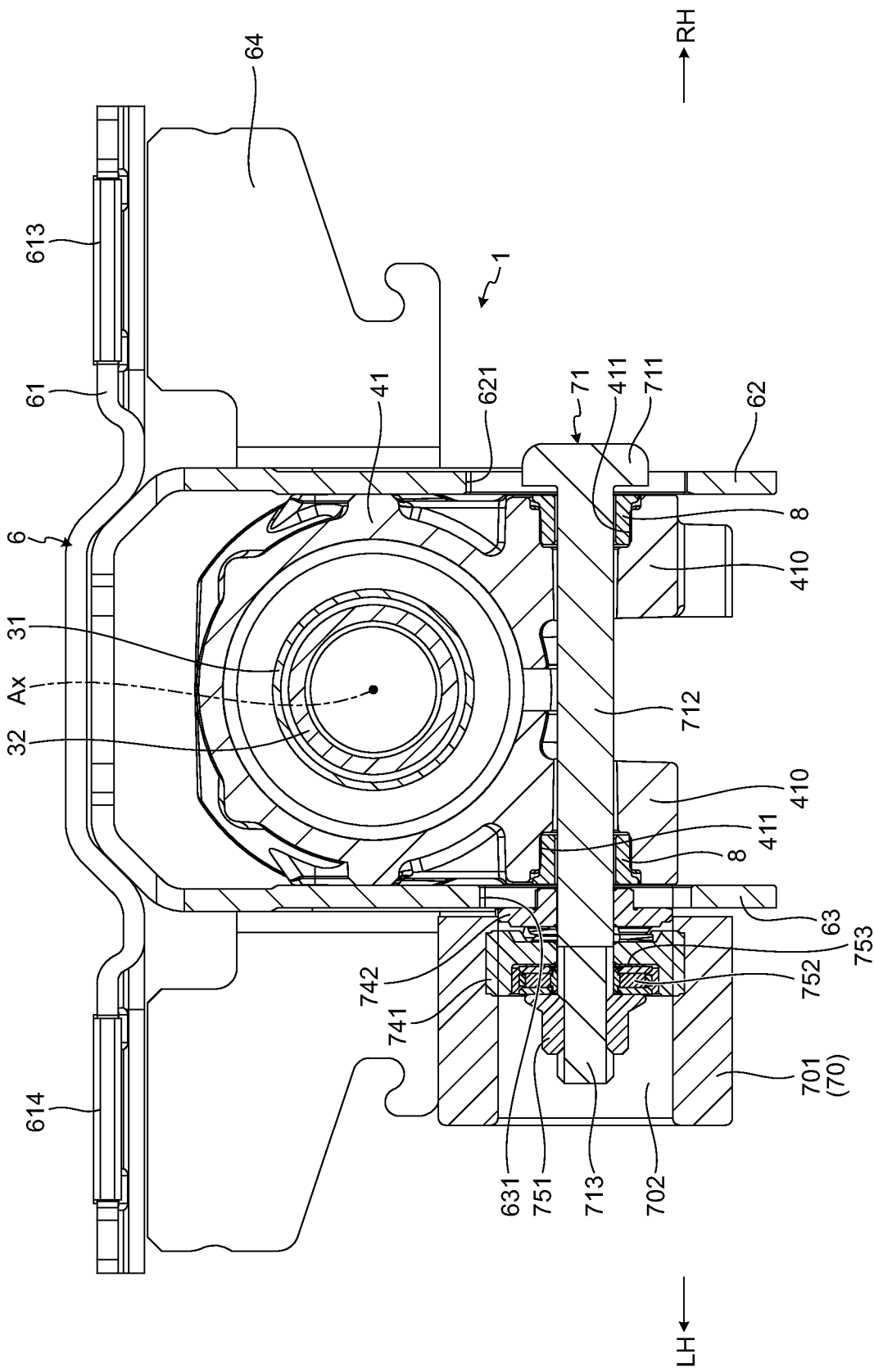
FIG. 4 is a cross-sectional diagram taken along line IV-IV of FIG. 3.

FIG. 1 is a perspective diagram of a steering device according to an embodiment. FIG. 2 is an exploded perspective diagram of the steering device of FIG. 1. FIG. 3 is a side diagram of a part of the steering device of FIG. 1. FIG. 4 is a cross-sectional diagram taken along line IV-IV of FIG. 3.

First, a basic configuration of the steering device 1 will be described. As illustrated in FIG. 1, a steering device 1 includes a steering wheel 2, the steering shaft 3, a steering column 4, a gear box 5, a tilt bracket 6, and a tilt mechanism 7. Note that the tilt bracket 6 is an example of the column bracket.

As illustrated in FIGS. 1 and 2, the steering wheel 2 is coupled to a rear end portion of the steering shaft 3. Then, when the driver operates the steering wheel 2, the steering shaft 3 rotates about the rotation axis Ax, and an operation torque is applied to the steering shaft 3.

The gear box 5 is provided at a front end portion of the steering shaft 3. An ECU 51 and an electric motor 52 are assembled to the gear box 5. The ECU 51 controls the operation of the electric motor 52. An assist torque is applied to the steering shaft 3 by the ECU 51 and the electric motor 52. That is, the steering device 1 of the present embodiment is an electric power steering device that assists the driver's steering with the electric motor 52.

The steering shaft 3 includes an upper shaft 31 and a lower shaft 32. The upper shaft 31 and the lower shaft 32 are cylindrical shafts. The upper shaft (input shaft) 31 and the lower shaft (output shaft) 32 illustrated in FIG. 4 extend in the axial direction and are formed in a cylindrical shape along the direction around the rotation axis Ax. The steering wheel 2 is coupled to a rear end portion of the upper shaft 31. A front end portion of the upper shaft 31 is externally fitted to the lower shaft 32. Specifically, the front end portion of the upper shaft 31 and a rear end portion of the lower shaft 32 are spline-fitted. Hence, the upper shaft 31 is slidable in the axial direction with respect to the lower shaft 32. In other words, the steering shaft 3 is extendable and retractable. Note that the upper shaft 31 is also referred to as an input shaft, and the lower shaft 32 is also referred to as an output shaft.

As illustrated in FIGS. 1 and 2, the steering column 4 is an outer cylinder extending in the axial direction and disposed on the outer peripheral side of the steering shaft 3. The steering column 4 includes an upper column 41 and a lower column 42. The upper column 41 rotatably supports the upper shaft (input shaft) 31. The upper column 41 is disposed near the steering wheel 2 (that is, a rear side of the vehicle body). The lower column 42 is disposed on the opposite side (that is, a front side of the vehicle body) of the steering wheel 2 with respect to the upper column 41. The lower column 42 rotatably supports the lower shaft (output shaft) 32. The upper column 41 and the lower column 42 have a cylindrical shape and are relatively movable in the axial direction.

The tilt bracket (column bracket) 6 is provided on the outer peripheral side of the steering column 4. The tilt bracket 6 includes a top plate portion 61, a pair of side plate portions 62 and 63, and a vertical plate 64.

As illustrated in FIGS. 1 and 2, the top plate portion 61 extends along a left-right direction. A notch 611 is provided at a right end portion of the top plate portion 61. The notch 611 extends long along parallel to the axial direction (that is, in a front-rear direction of the vehicle body). The notch 611 has an open end at a rear side end portion of the vehicle body. A detachment capsule 613 is provided at a right end portion of the top plate portion 61. In other words, the detachment capsule 613 sandwiches the right end portion of the top plate portion 61 from above and below so as to cover the notch 611. The detachment capsule 613 is a plate-shaped member obtained by bending two plate members at a rear end 613a. The detachment capsule 613 has a through-hole 615 having a circular shape. In a state where the detachment capsule 613 is fitted to the right end portion of the top plate portion 61, the through-hole 615 overlaps the notch 611. Accordingly, a fixing pin (not illustrated) fixed to a vehicle body 100 illustrated in FIG. 7 described below holds the detachment capsule 613 in a state of penetrating the through-hole 615 and the notch 611. In addition, the side plate portion 62 extends downward from a lower surface of the top plate portion 61. The side plate portion 62 is located on the left side of the notch 611. The side plate portion 62 is provided with a tilt long hole 621. The tilt long hole 621 is a long hole extending along an up-down direction. Note that the vertical plate 64 extends downward from a front end of the top plate portion 61.

As illustrated in FIGS. 1 and 2, a notch 612 is provided at a left end portion of the top plate portion 61. The notch 612 extends long along parallel to the axial direction (that is, in the front-rear direction of the vehicle body). The notch 612 has an open end at a rear side end portion of the vehicle body. A detachment capsule 614 is provided at a left end portion of the top plate portion 61. In other words, the detachment capsule 614 sandwiches the left end portion of the top plate portion 61 from above and below so as to cover the notch 612. The detachment capsule 614 is a plate-shaped member obtained by bending two plate members at a rear end 614a. The detachment capsule 614 has a through-hole 616 having a circular shape. In a state where the detachment capsule 614 is fitted to the left end portion of the top plate portion 61, the through-hole 616 overlaps the notch 612. Accordingly, a fixing pin (not illustrated) fixed to the vehicle body 100 illustrated in FIG. 7 described below holds the detachment capsule 614 in a state of penetrating the through-hole 616 and the notch 612. In addition, the side plate portion 63 extends downward from the lower surface of the top plate portion 61. The side plate portion 63 is located on the right side of the notch 612. The side plate portion 63 is provided with a tilt long hole 631. The tilt long hole 631 is a long hole extending along the up-down direction. Thus, the steering device 1 is fixed to the vehicle body 100 via the detachment capsules 613 and 614, the top plate portion 61, and the fixing pins, which are not illustrated. As described above, the tilt bracket (column bracket) 6 includes the side plate portions 62 and 63 located on the sides of the upper column 41.

As illustrated in FIGS. 1 to 4, the steering device 1 includes the tilt mechanism 7. The tilt mechanism 7 includes an operation lever 70, a tilt bolt (pin) 71, support members 8, a cam 74, and leg portions 410.

The tilt bolt (pin) 71 includes a head portion 711, a shaft portion 712, and a screw portion 713. The outer periphery of the shaft portion 712 is smooth, and a male screw is formed on the outer periphery of the screw portion 713. The tilt bolt (pin) 71 extends along the left-right direction as described below. That is, the tilt bolt 71 extends along a vehicle width direction and is provided to penetrate the side plate portions 62 and 63, the pair of support members 8, the cam 74, the operation lever 70, a nut 751, a thrust bearing 752, and a washer 753.

In the embodiment, one support member 8 is provided on each of the left and right sides of the upper column 41. Specifically, a pair of leg portions 410 is provided downward on both left and right sides of the upper column 41, and the support members 8 are fitted to the leg portions 410. The leg portion 410 has a rectangular shape extending in the front-rear direction when viewed from the side. The leg portion 410 is provided with a column long hole 411 extending along the axial direction. The column long hole 411 penetrates the leg portion 410 in the left-right direction. The support member 8 is fitted into the column long hole 411 of the leg portion 410. In other words, the support member 8 is detachably provided in the column long hole 411 of the leg portion 410. The structure of the support member 8 will be described below in detail.

The operation lever 70 includes a base portion 701 and a lever portion 703. The base portion 701 is a cylindrical body, and an insertion hole 702 is provided to penetrate in the left-right direction. The lever portion 703 is fixed to an outer peripheral surface of the base portion 701. When the lever portion 703 is pushed downward, the base portion 701 rotates.

Here, as illustrated in FIG. 4, a rotation cam 741 is fitted to an inner peripheral surface of the insertion hole 702 of the base portion 701. Specifically, a tooth portion is formed on the outer periphery of the rotation cam 741, and an uneven portion is formed on the inner peripheral surface of the insertion hole 702. The tooth portion of the rotation cam 741 meshes with the uneven portion of the insertion hole 702. Accordingly, the base portion 701 and the rotation cam 741 rotate integrally. In addition, since a fixed cam 742 does not rotate, the rotation cam 741 and the fixed cam 742 can relatively rotate. Then, the shaft portion 712 of the tilt bolt (pin) 71 penetrates through the tilt long hole 621 of the side plate portion 62 of the tilt bracket 6, the support members 8, the tilt long hole 631 of the side plate portion 63, the fixed cam 742, the rotation cam 741, the thrust bearing 752, and the washer 753. In addition, the screw portion 713 provided at a tip portion of the shaft portion 712 meshes with the nut 751, so that the screw portion 713 is fastened to the nut 751. Thus, when the operation lever 70 is rotated downward to change the up-down position of the steering column 4 with respect to the tilt bracket 6, the tilt bolt (pin) 71 moves up and down inside the tilt long hole 621 of the side plate portion 62 and the tilt long hole 631 of the side plate portion 63. Then, when the operation lever 70 is rotated upward after the appropriate height position is reached, the rotation cam 741 rotates with respect to the fixed cam 742, so that the up-down position of the steering column 4 with respect to the tilt bracket 6 is fixed.

Figure 5:
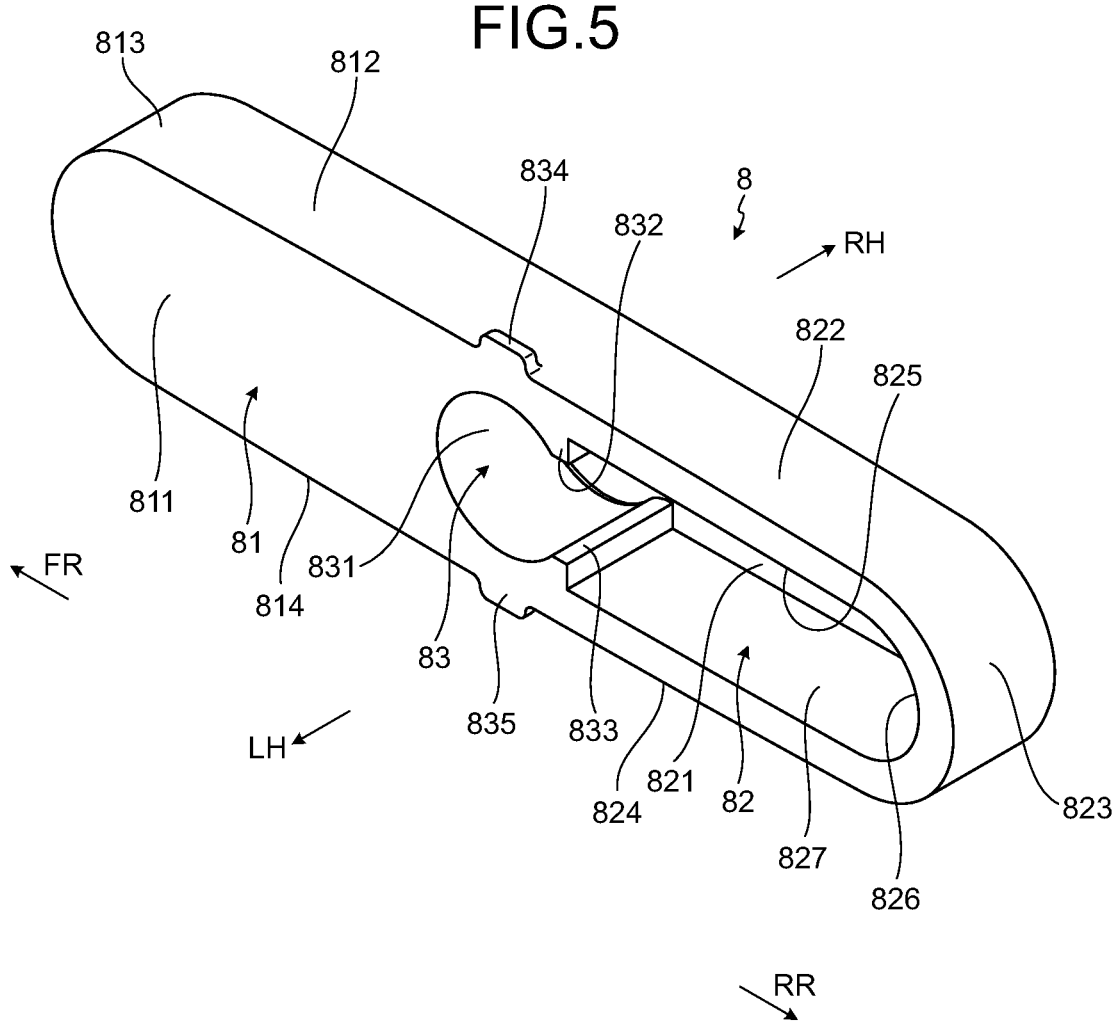
FIG. 5 is a perspective diagram of a support member according to an embodiment.
Figure 6:
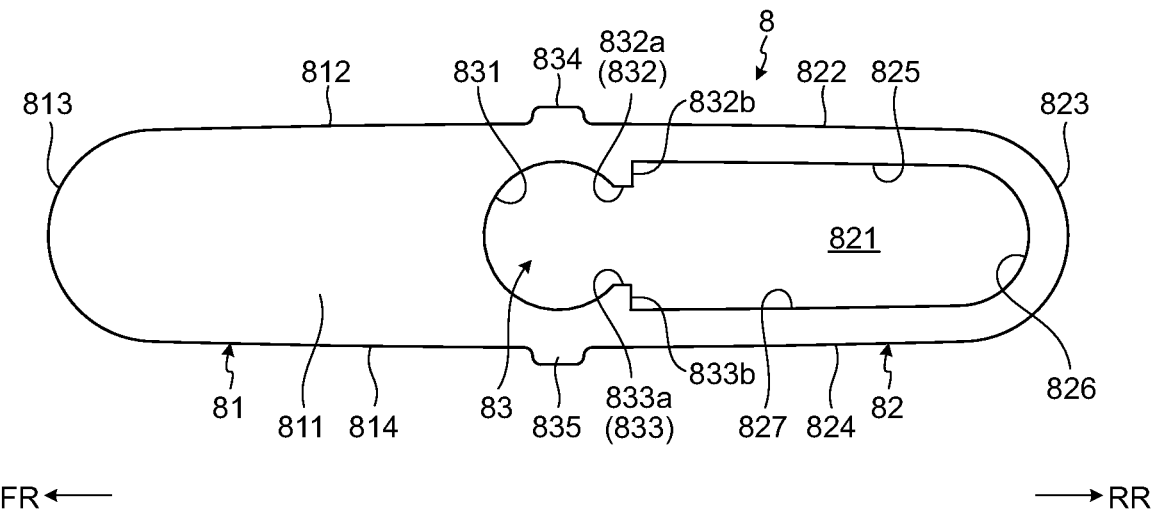
FIG. 6 is a side diagram of FIG. 5.
Figure 7:
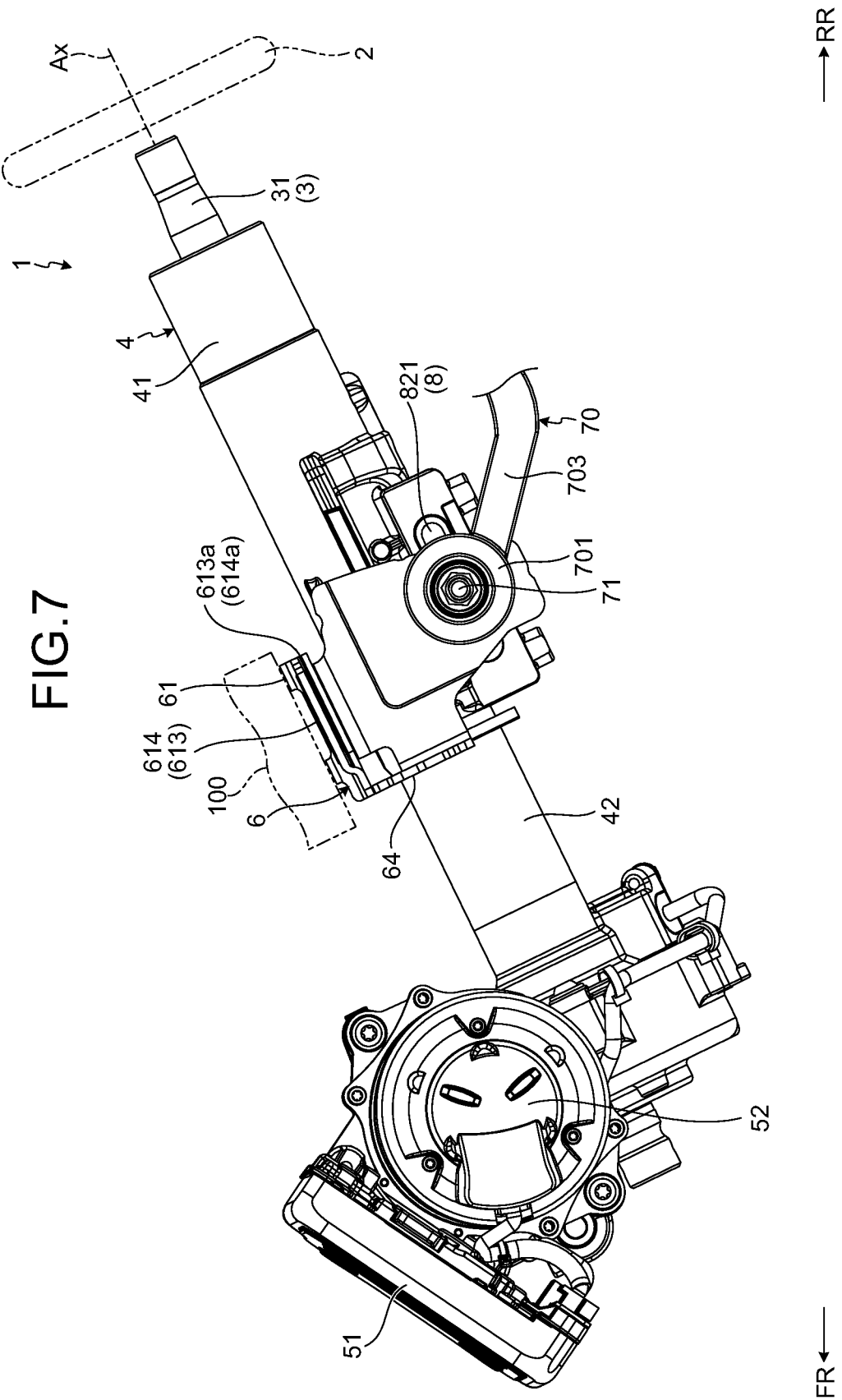
FIG. 7 is a side diagram of a steering device according to an embodiment.

Next, the structure of the support member 8 will be described. FIG. 5 is a perspective diagram of a support member according to an embodiment. FIG. 6 is a side diagram of FIG. 5. FIG. 7 is a side diagram of a steering device according to an embodiment.

As illustrated in FIGS. 5 to 7, the support member 8 is a bracket extending long in the axial direction. Note that although the support member 8 illustrated in FIGS. 5 and 6 is disposed on the left side of the vehicle body, the support member 8 disposed on the right side of the vehicle body also has the same structure.

The support member 8 includes a first portion 81 on the front side, a second portion 82 on the rear side, and a through-hole 83 provided at a central portion in the front-rear direction. The first portion 81 is a solid member, and a side surface 811 on the left side is flat. In addition, an upper surface 812 and a lower surface 814 of the first portion 81 are also flat. A front end surface 813 has an arc shape when viewed from the side. The second portion 82 is a frame-shaped member and has a long hole 821 penetrating in the left-right direction. An upper surface 822 and a lower surface 824 of the second portion 82 are flat. A rear end surface 823 has an arc shape when viewed from the side. In addition, the edge of the long hole 821 includes an upper surface 825, a lower surface 827, and a rear end surface 826. The upper surface 825 and the lower surface 827 are flat. The rear end surface 826 has an arc shape when viewed from the side. That is, the upper surface 822 and the upper surface 825 extend parallel to each other, and the lower surface 824 and the lower surface 827 extend parallel to each other. In addition, the rear end surface 823 and the rear end surface 826 are concentric arcs. The through-hole 83 is a circular through-hole penetrating the support member 8 in the left-right direction. Specifically, an inner peripheral surface 831 of the through-hole 83 has an arc shape when viewed from the side. The shaft portion 712 of the tilt bolt 71 penetrates through the through-hole 83. The through-hole 83 communicates with the long hole 821. In other words, the long hole 821 extends rearward from the through-hole 83, that is, toward the steering wheel 2. Protrusions 832 and 833 are disposed between the through-hole 83 and the long hole 821. The protrusion 832 is provided at a boundary between the inner peripheral surface 831 and the upper surface 825 and protrudes downward. The protrusion 832 includes a lower surface 832a and a side surface 832b. The protrusion 833 is provided at a boundary between the inner peripheral surface 831 and the lower surface 827 and protrudes upward. The protrusion 833 includes an upper surface 833a and a side surface 833b. The side surface 832b and the upper surface 825 are orthogonal to each other, and the side surface 833b and the lower surface 827 are orthogonal to each other. Accordingly, when a rearward load from the through-hole 83 toward the long hole 821 is input, the protrusion 832 and the protrusion 833 easily fall toward the long hole 821 side. In addition, protruding portions 834 and 835 are members for determining a direction in which the support member 8 is inserted into the column long hole 411 of the upper column 41. Note that the protrusion 832 and the protrusion 833 are disposed opposite each other. The protrusion 832 and the protrusion 833 are stoppers for holding the tilt bolt 71 in the through-hole 83. Note that the side plate portions 62 and 63 of the tilt bracket 6 described above include the tilt long holes 621 and 631 extending in a direction intersecting with the extending direction of the long hole 821 of the support member 8.

Figure 8:
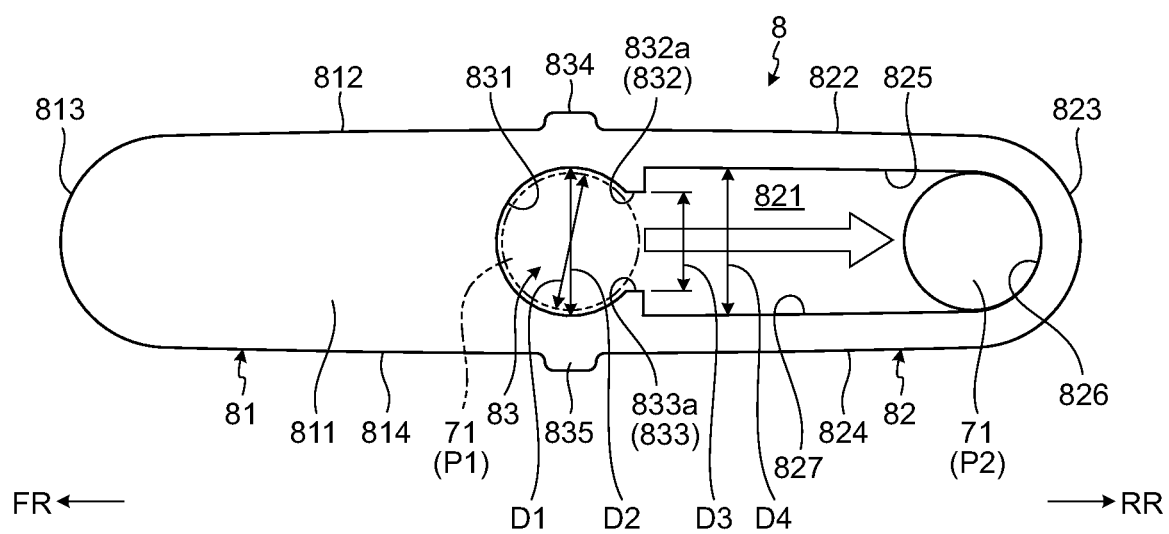
FIG. 8 is a side diagram of a support member according to an embodiment, and is a diagram schematically illustrating positions of a pin before and after a secondary collision.
Figure 9:
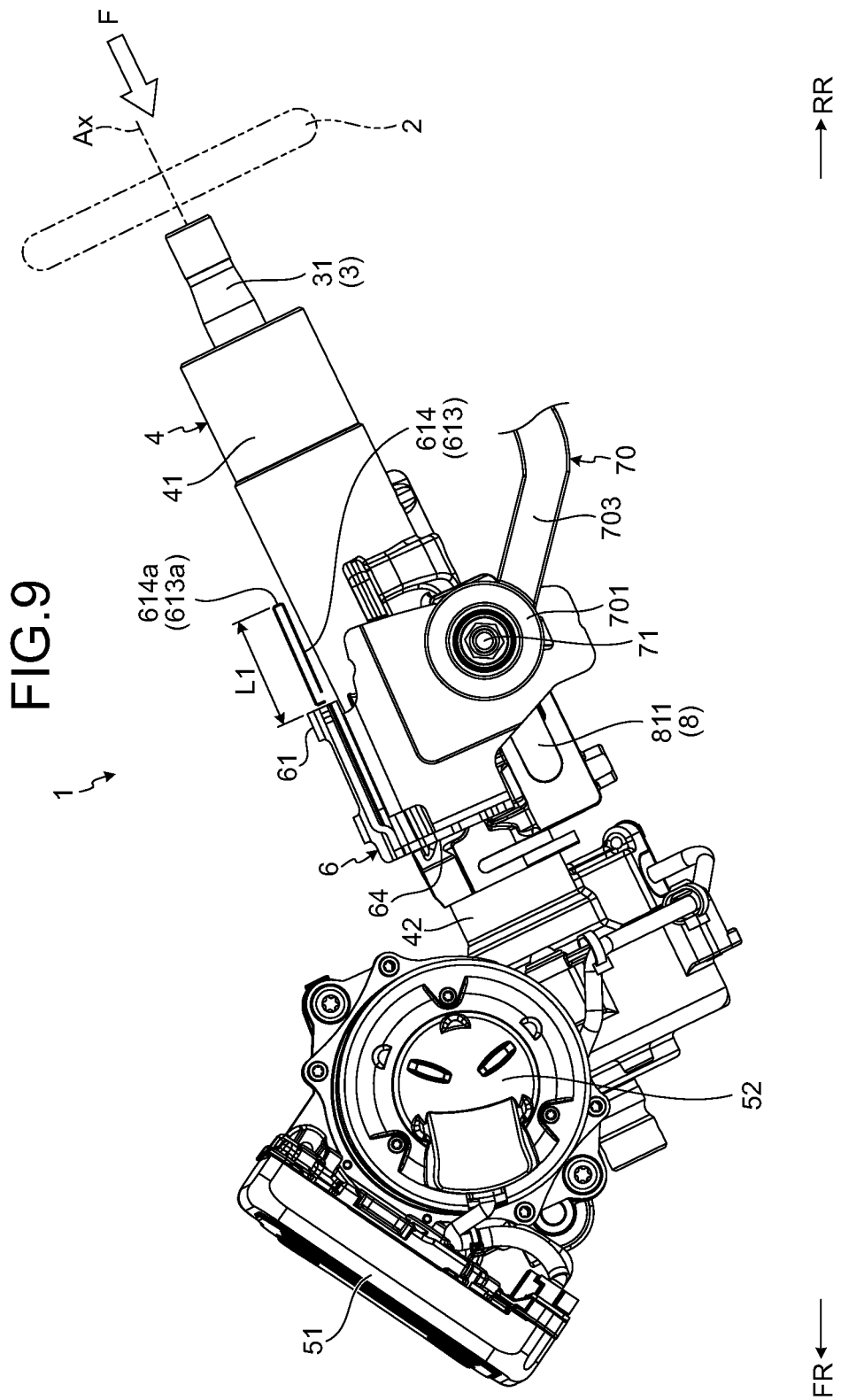
FIG. 9 is a side diagram of a steering device according to an embodiment, and is a diagram illustrating a state after a secondary collision.
Figure 10:
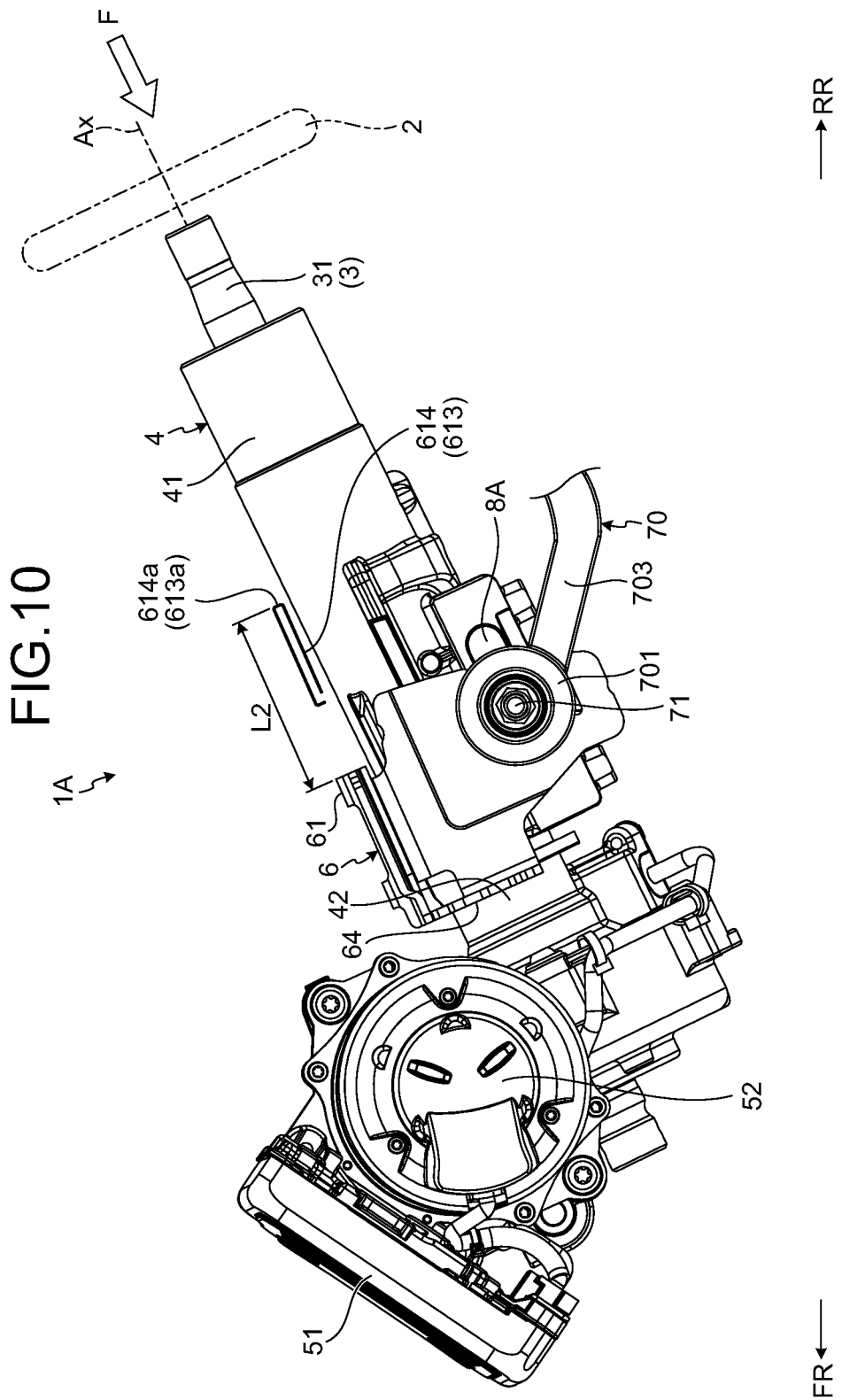
FIG. 10 is a side diagram of a steering device according to a comparative example, and is a diagram illustrating a state after a secondary collision.
Figure 11:
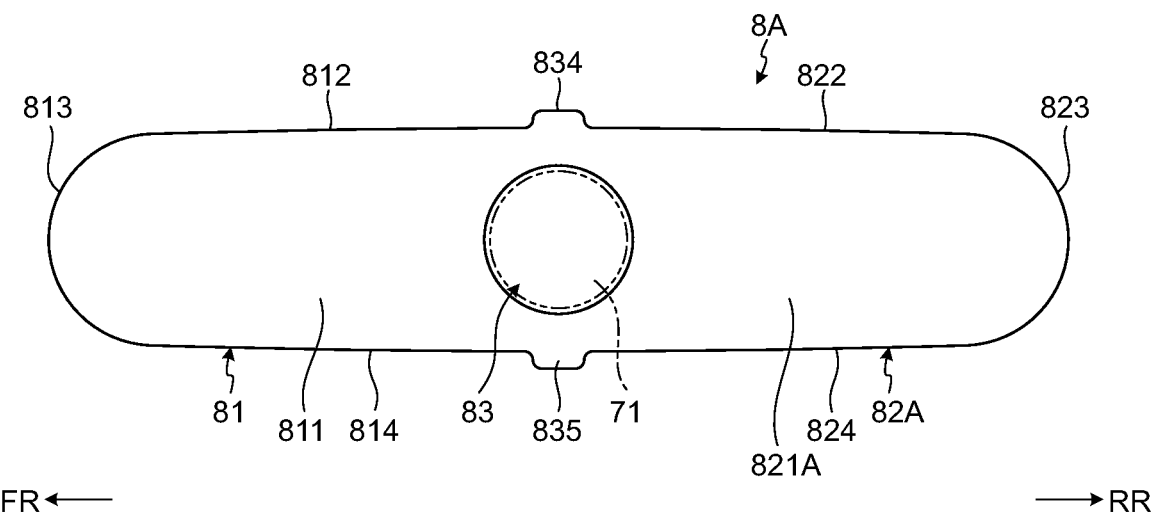
FIG. 11 is a side diagram of a support member according to a comparative example, and is a diagram schematically illustrating positions of a pin before and after a secondary collision.
Figure 12:
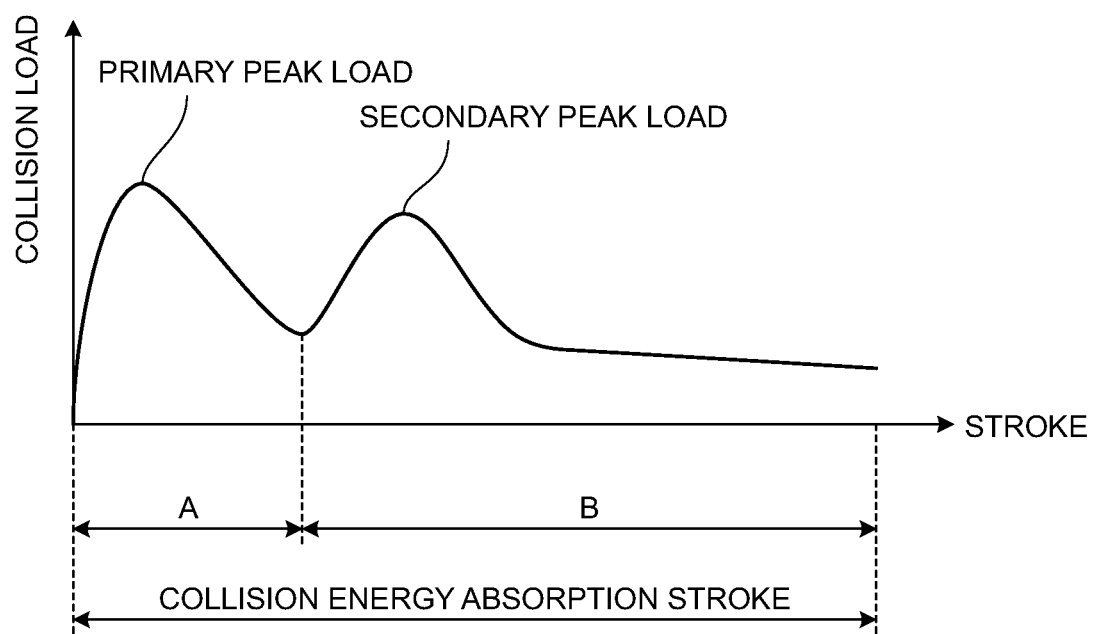
FIG. 12 is a graph schematically illustrating a relationship between a collision load applied to the steering device and a stroke in a secondary collision.

Next, the movement of the steering device 1 when the vehicle causes the secondary collision will be described. FIG. 8 is a side diagram of a support member according to an embodiment, and is a diagram schematically illustrating positions of a pin before and after a secondary collision. FIG. 9 is a side diagram of a steering device according to an embodiment, and is a diagram illustrating a state after a secondary collision. FIG. 10 is a side diagram of a steering device according to a comparative example, and is a diagram illustrating a state after a secondary collision. FIG. 11 is a side diagram of a support member according to a comparative example, and is a diagram schematically illustrating positions of a pin before and after a secondary collision. FIG. 12 is a graph schematically illustrating a relationship between a collision load applied to the steering device and a stroke in a secondary collision.

First, dimensions of each portion will be described with reference to FIG. 8. A diameter of the shaft portion 712 of the tilt bolt (pin) 71 is D1, an inner diameter of the through-hole 83 is D2, a separation distance between the lower surface 832a of the protrusion 832 and the upper surface 833a of the protrusion 833 is D3, and a separation distance between the upper surface 825 and the lower surface 827 is D4. The diameter D1 is smaller than the inner diameter D2. The separation distance D3 is smaller than the diameter D1. The separation distance D4 is larger than the diameter D1.

First, as illustrated in FIG. 7, in a normal state, the steering device 1 is fixed to the vehicle body 100 via the detachment capsules 613 and 614, the top plate portion 61, and the fixing pins, which are not illustrated. In addition, as indicated by a first position P1 indicated by the two-dot chain line in FIG. 8, the tilt bolt (pin) 71 is provided to penetrate through the through-hole 83 of the support member 8.

Next, when the vehicle causes a secondary collision after a primary collision, a force F directed forward (front side in the axial direction) with respect to the steering wheel 2 is input from the driver. Then, as illustrated in FIG. 9, the steering shaft 3 and the steering column 4 move relatively forward with respect to the tilt bolt (pin) 71, the tilt bracket 6, and the gear box 5. At this time, as illustrated in FIG. 8, the support member 8 moves forward with respect to the tilt bolt (pin) 71. That is, the support member 8 moves forward without changing the position of the tilt bolt (pin) 71 in the axial direction in the initial stage of the secondary collision. Since the support member 8 is fixed to the steering column 4, the steering shaft 3 and the steering column 4 move forward with respect to the tilt bolt (pin) 71. In FIG. 8, regarding the tilt bolt (pin) 71, the first position P1 in the normal state is indicated by the two-dot chain line, and a second position P2 in the initial stage of the secondary collision is indicated by the solid line. As described above, after the secondary collision, the tilt bolt (pin) 71 damages the protrusions 832 and 833 and relatively moves in the long hole 821 along the axial direction toward the steering wheel 2. Then, at the second position P2, the tilt bolt (pin) 71 butts against the rear end surface 826 of the edge of the long hole 821.

In a late stage of the secondary collision after the tilt bolt (pin) 71 butts against the rear end surface 826 of the edge of the long hole 821, the tilt bolt (pin) 71 hits the inner peripheral surfaces of the tilt long holes 621 and 631, and the tilt bolt (pin) 71 pushes the tilt bracket 6 forward. Then, in a state where the detachment capsules 613 and 614 are fixed to the vehicle body 100, the top plate portion 61 is detached from the detachment capsules 613 and 614, and the tilt bracket 6 moves forward as illustrated in FIG. 9. In FIG. 9, the rear ends 613a and 614a of the detachment capsules 613 and 614 move to the front side in the axial direction by a distance L1 from the rear end of the notch 611. In this manner, as illustrated in FIG. 9, the tilt bracket 6 moves to the front side in the axial direction by the distance L1 due to the secondary collision.

On the other hand, a steering device 1A of FIG. 10 according to a comparative example includes a support member 8A illustrated in FIG. 11. The support member 8A is different from the support member 8 in that there is no long hole 821. That is, a second portion 82A of the support member 8A includes a side surface 821A flush with a side surface 811. Thus, the support member 8A has a front-rear symmetrical shape across a through-hole 83. In addition, the through-hole 83 is circular in a side view, and a tilt bolt 71 is movable together with the support member 8A in a state where the tilt bolt 71 penetrates through the through-hole 83.

Accordingly, as illustrated in FIG. 10, when the vehicle causes a secondary collision and a force F directed forward (front side in the axial direction) with respect to a steering wheel 2 is input from the driver, a top plate portion 61 is detached from detachment capsules 613 and 614 in a state where the detachment capsules 613 and 614 are fixed to a vehicle body 100. Thereafter, as illustrated in FIG. 10, a tilt bracket 6 moves forward. In FIG. 10, rear ends 613a and 614a of the detachment capsules 613 and 614 move to the front side in the axial direction by a distance L2 from the rear end of a notch 611. As described above, in the secondary collision of the comparative example, there is no stage corresponding to the initial stage of the secondary collision of the embodiment, and there is only a stage corresponding to the late stage. Accordingly, in the comparative example, when the secondary collision occurs, the top plate portion 61 is detached from the detachment capsules 613 and 614, and the tilt bracket 6 moves forward. Accordingly, the tilt bracket 6 moves to the front side in the axial direction by the distance L2.

As described above, with the steering device 1 according to the embodiment, after the secondary collision, the tilt bolt (pin) 71 damages the protrusions 832 and 833 of the support member 8 and relatively moves in the long hole 821 along the axial direction toward the steering wheel 2. Accordingly, when the embodiment is compared with the comparative example, the movement distance of the tilt bracket 6 is reduced by the axial distance of the long hole 821 in the embodiment. That is, the distance L1 is smaller than the distance L2 by the axial distance of the long hole 821.

In addition, as illustrated in FIG. 12, in the embodiment, two peaks of the collision load are formed when the vehicle causes the secondary collision. That is, in an initial stage A, after the driver hits the steering wheel 2, the tilt bolt (pin) 71 damages the protrusions 832 and 833 and relatively moves in the long hole 821 along the axial direction toward the steering wheel 2. For this reason, in the initial stage A, the collision load reaches a primary peak load. In addition, in a late stage B, the tilt bolt (pin) 71 pushes the tilt bracket 6 forward, the top plate portion 61 is detached from the detachment capsules 613 and 614, and the tilt bracket 6 moves forward. For this reason, in the late stage B, the collision load reaches a secondary peak load.

On the other hand, in the comparative example, since the collision load rapidly increases immediately after the secondary collision, the peak load of the comparative example is larger than the primary peak load and the secondary peak load of the embodiment. In addition, the area of the portion surrounded by the graph of the collision load and an X axis (stroke) indicates the collision energy absorption amount.

As described above, the steering device 1 according to the embodiment includes the upper shaft (input shaft) 31 coupled to the steering wheel 2 and extending in the axial direction, the lower shaft (output shaft) 32 a part of which is fitted to the upper shaft 31 and capable of relatively moving in the axial direction with respect to the upper shaft 31, the upper column 41 having a cylindrical shape that is disposed on the radially outer side of the upper shaft 31 and rotatably supports the upper shaft 31, the lower column 42 having a cylindrical shape that is fitted to the upper column 41 and capable of relatively moving in the axial direction with respect to the upper column 41, the tilt bracket (column bracket) 6 that includes the side plate portions 62 and 63 located on the sides of the upper column 41 and is detachable from the vehicle body 100, the support members 8 provided on the upper column 41, and the tilt bolt 71 that is provided to extend along the radial direction and penetrate through the side plate portions 62 and 63 and the support members 8. The support member 8 includes the through-hole 83 through which the tilt bolt 71 penetrates, the long hole 821 extending from the through-hole 83 toward the steering wheel 2, and the protrusions (stoppers) 832 and 833 positioned between the through-hole 83 and the long hole 821 and supporting the tilt bolt 71.

When the driver hits the steering wheel 2 at the time of the secondary collision, a force to the front side is transmitted to the upper column 41 via the upper shaft (input shaft) 31. Since the upper column 41 is provided with the support member 8, the support member 8 moves forward relative to the tilt bolt 71. Specifically, when the support member 8 moves forward, the protrusions (stoppers) 832 and 833 are damaged by the tilt bolt 71, and the tilt bolt 71 relatively moves in the long hole 821 of the support member 8. Then, when the tilt bolt 71 hits the rear end surface 826 of the edge of the long hole 821, next, the tilt bolt 71 pushes the side plate portions 62 and 63 forward, so that the tilt bracket (column bracket) 6 is detached from the vehicle body. Thereafter, the upper column 41 and the column bracket move forward. As described above, according to the present disclosure, the forward movement amount of the tilt bracket (column bracket) 6 is reduced by the distance over which the tilt bolt 71 moves in the long hole 821 of the support member 8 at the time of the secondary collision. Accordingly, the space portion on the front side of the tilt bracket (column bracket) 6 after the secondary collision becomes larger, and more components or a larger component can be disposed in the space portion on the front side of the tilt bracket (column bracket) 6. Note that the support member 8 has an asymmetric shape in the front-rear direction across the center in the front-rear direction. The support member 8 attached to the right side of the upper column 41 can be attached to the left side of the upper column 41 with attention being paid to the direction of the long hole 821.

The upper column 41 includes the column long hole 411 extending along the axial direction, and the support member 8 is disposed in the column long hole 411. Thus, when the support member 8 is attached to the column long hole 411, the specification not having the telescopic function is obtained, and the support member 8 can be detached from the column long hole 411 to provide the telescopic specification. As described above, the telescopic specification and the specification not having the telescopic function can be applied to the same upper column 41, and component sharing of the upper column 41 can be achieved.

The support member 8 is detachably provided on the upper column 41. In this manner, by attaching and detaching the support member 8 to and from the upper column 41, it is possible to easily switch between the telescopic specification and the specification not having the telescopic function.

By appropriately changing the height of the protrusions (stoppers) 832 and 833, it is possible to easily adjust the magnitude of a load that the tilt bolt 71 gets over the protrusions 832 and 833 and enters the long hole 821.

The side plate portions 62 and 63 include the tilt long holes 621 and 631 extending in the up-down direction, and the tilt bolt 71 penetrates through the tilt long holes 621 and 631. Thus, it can also be applied to a tilt-type steering device for changing the height of the steering wheel 2 according to the driver's physique, driving posture, and the like.

[First Modification]

Figure 13:
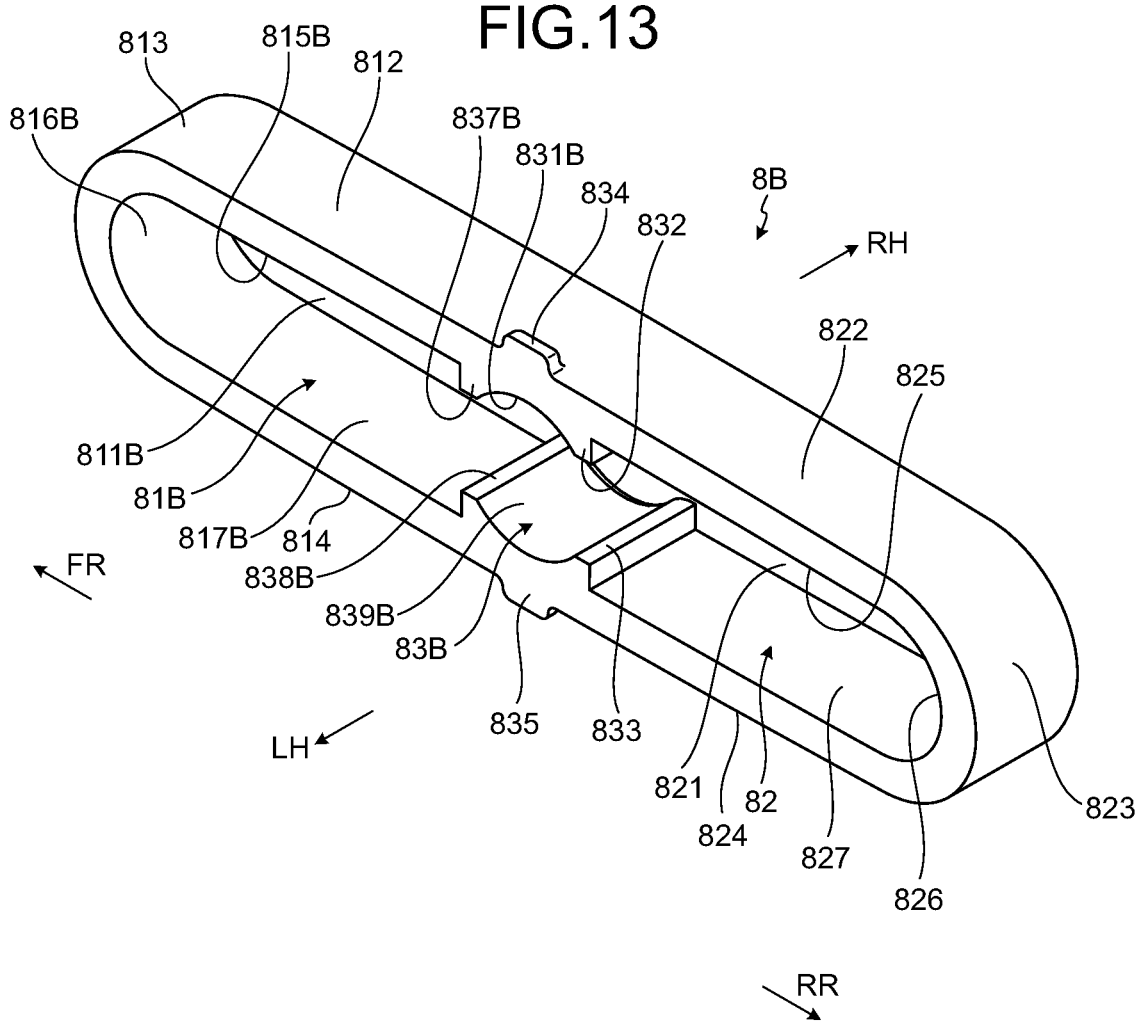
FIG. 13 is a perspective diagram of a support member according to a first modification.
Figure 14:
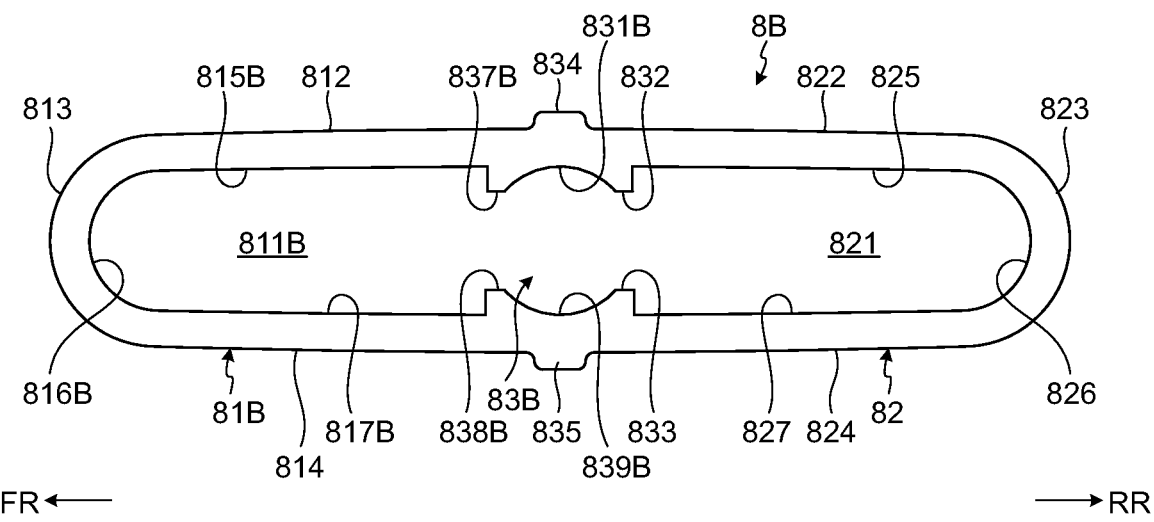
FIG. 14 is a side diagram of FIG. 13.

Next, a support member according to a first modification will be described. FIG. 13 is a perspective diagram of the support member according to the first modification. FIG. 14 is a side diagram of FIG. 13.

As illustrated in FIGS. 13 and 14, a support member 8B is a bracket extending long in the axial direction. Note that although the support member 8B is disposed on the left side of the vehicle body, the support member 8B disposed on the right side of the vehicle body also has the same structure.

The support member 8B includes a first portion 81B on the front side, a second portion 82 on the rear side, and a through-hole 83B provided at a central portion in the front-rear direction. The first portion 81B is a frame-shaped member and has a through-hole 811B penetrating in the left-right direction. An upper surface 812 and a lower surface 814 of the first portion 81B are flat. A front end surface 813 has an arc shape when viewed from the side. In addition, the edge of the through-hole 811B includes an upper surface 815B, a lower surface 817B, and a front end surface 816B. The upper surface 815B and the lower surface 817B are flat. The front end surface 816B has an arc shape when viewed from the side. That is, the upper surface 812 and the upper surface 815B extend parallel to each other, and the lower surface 814 and the lower surface 817B extend parallel to each other. In addition, the front end surface 813 and the front end surface 816B are concentric arcs.

The second portion 82 is a frame-shaped member and has a long hole 821 penetrating in the left-right direction. Since the configuration of the second portion 82 is the same as that of the first embodiment illustrated in FIGS. 5 and 6, the description thereof will be omitted.

The through-hole 83B penetrates the support member 8B in the left-right direction. Specifically, inner peripheral surfaces 831B and 839B of the through-hole 83B have an arc shape when viewed from the side. The shaft portion 712 of the tilt bolt 71 penetrates through the through-hole 83B. The through-hole 83B communicates with the long hole 821. In other words, the long hole 821 extends rearward from the through-hole 83B, that is, toward the steering wheel 2. Protrusions 832, 833, 837B, and 838B that support the tilt bolt 71 are disposed between the through-hole 83B and the long hole 821. The protrusion 832 is provided at a boundary between the inner peripheral surface 831 and the upper surface 825 and protrudes downward. The protrusion 833 is provided at a boundary between the inner peripheral surface 831 and the lower surface 827 and protrudes upward. The protrusion 832 and the protrusion 833 are disposed opposite each other. The protrusion 832 and the protrusion 833 are stoppers for holding the tilt bolt 71 in the through-hole 83B. In addition, the protrusions 837B and 838B have shapes symmetrical to the protrusions 832 and 833 across the center of the support member 8B in a longitudinal direction. The protrusion 837B protrudes downward, and the protrusion 838B protrudes upward.

As described above, also in the first modification, the support member 8B includes the through-hole 83B through which the tilt bolt 71 penetrates, the long hole 821, and the protrusions (stoppers) 832 and 833. Accordingly, the forward movement amount of the tilt bracket (column bracket) 6 is reduced by the distance over which the tilt bolt 71 moves in the long hole 821 of the support member 8B at the time of the secondary collision. In addition, since the support member 8B has a symmetrical shape in the front-rear direction across the center in the front-rear direction, the support member 8B can be attached to the column long hole 411 of the upper column 41 upside down. Accordingly, the assembling work of the support member 8B is facilitated.

[Second Modification]

Figure 15:
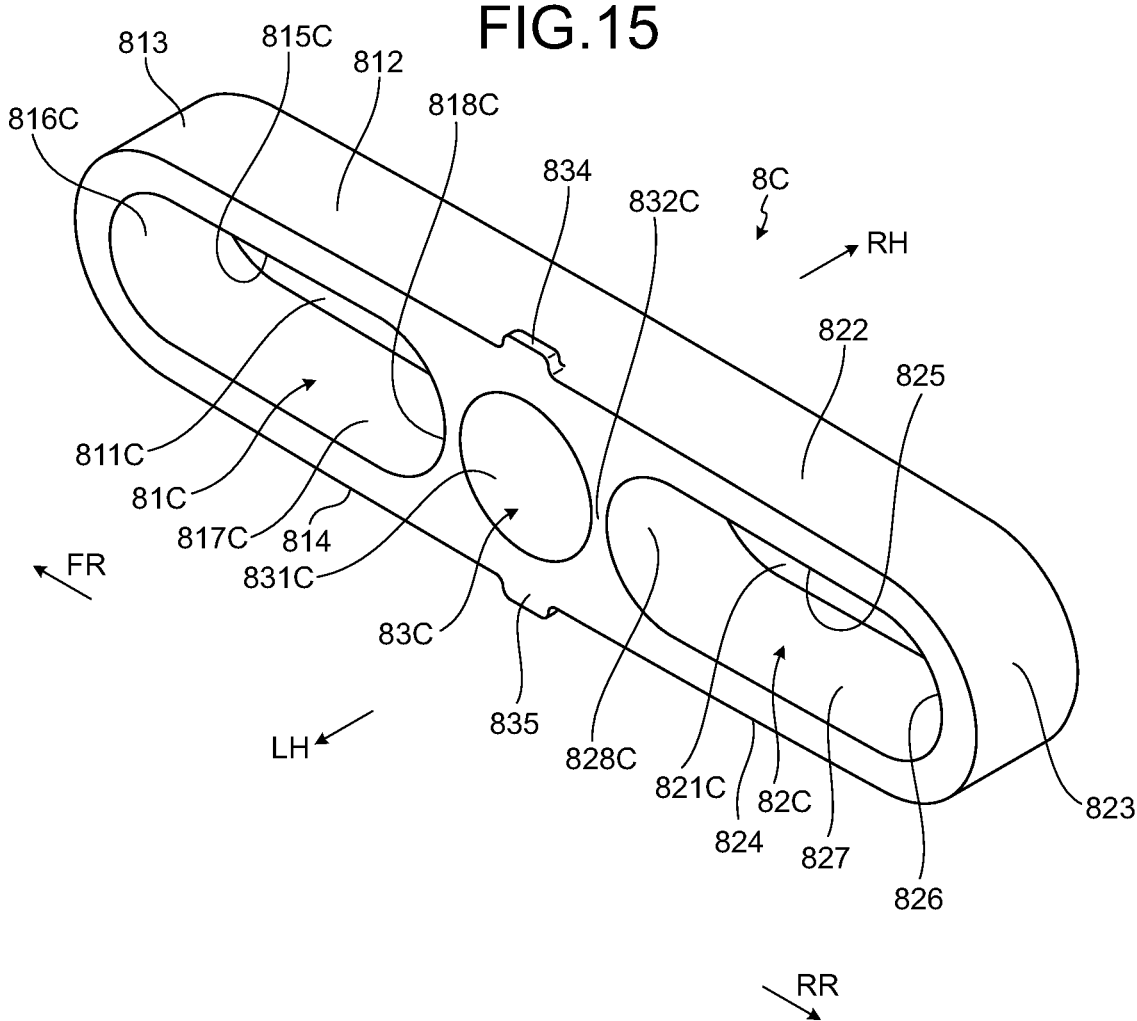
FIG. 15 is a perspective diagram of a support member according to a second modification.
Figure 16:
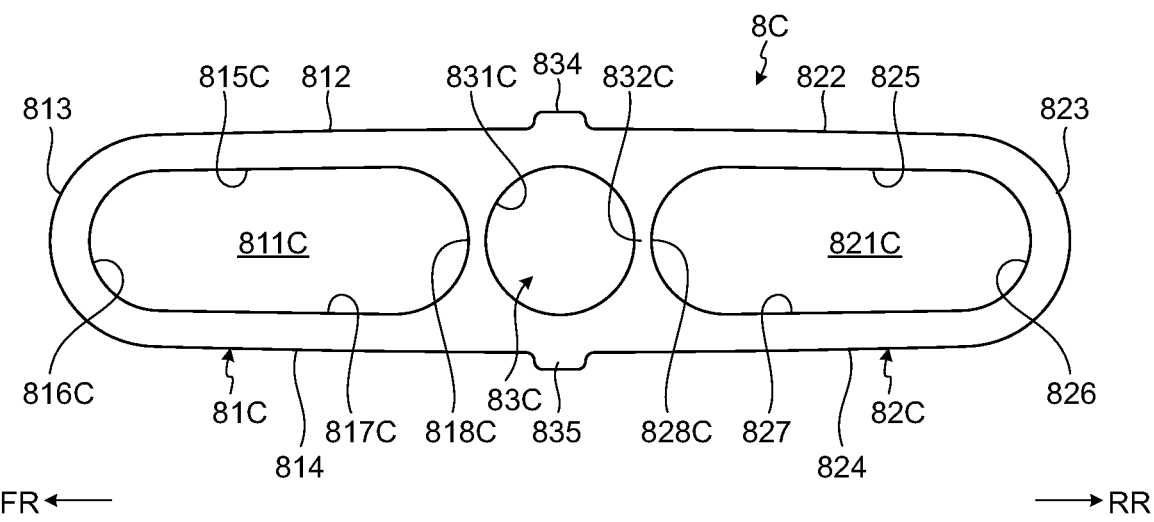
FIG. 16 is a side diagram of FIG. 15.

Next, a support member according to a second modification will be described. FIG. 15 is a perspective diagram of the support member according to the second modification. FIG. 16 is a side diagram of FIG. 15.

As illustrated in FIGS. 15 and 16, a support member 8C is a bracket extending long in the axial direction. Note that although the support member 8C is disposed on the left side of the vehicle body, the support member 8C disposed on the right side of the vehicle body also has the same structure.

The support member 8C includes a first portion 81C on the front side, a second portion 82C on the rear side, and a through-hole 83C provided at a central portion in the front-rear direction. The first portion 81C is a frame-shaped member and has a through-hole 811C penetrating in the left-right direction. An upper surface 812 and a lower surface 814 of the first portion 81C are flat. A front end surface 813 has an arc shape when viewed from the side. In addition, the edge of the through-hole 811C includes an upper surface 815C, a lower surface 817C, a front end surface 816C, and a rear end surface 818C. The upper surface 815C and the lower surface 817C are flat. The front end surface 816C and the rear end surface 818C have an arc shape when viewed from the side. That is, the upper surface 812 and the upper surface 815C extend parallel to each other, and the lower surface 814 and the lower surface 817C extend parallel to each other. In addition, the front end surface 813 and the front end surface 816C are concentric arcs.

The second portion 82C is a frame-shaped member and has a long hole 821C penetrating in the left-right direction. The edge of the long hole 821C includes an upper surface 825, a lower surface 827, a rear end surface 826, and a front end surface 828C. The front end surface 828C has an arc shape when viewed from the side.

The through-hole 83C is a circular through-hole. That is, an inner peripheral surface 831C of the through-hole 83C is circular. A stopper portion (stopper) 832C that supports the tilt bolt 71 is provided between the through-hole 83C and the long hole 821C. The through-hole 83C and the long hole 821C are separated by the stopper portion 832C. The stopper portion 832C is a stopper for holding the tilt bolt 71 in the through-hole 83C. At the time of collision, the tilt bolt 71 hits the stopper portion 832C and the stopper portion 832C is broken, so that the tilt bolt 71 can move from the through-hole 83C to the long hole 821C.

As described above, also in the second modification, the support member 8C includes the through-hole 83C through which the tilt bolt 71 penetrates, the long hole 821C, and the stopper portion 832C. Accordingly, the forward movement amount of the tilt bracket (column bracket) 6 is reduced by the distance over which the tilt bolt 71 moves in the long hole 821 of the support member 8C at the time of the secondary collision. In addition, since the support member 8C has a symmetrical shape in the front-rear direction across the center in the front-rear direction, the support member 8C can be attached to the column long hole 411 of the upper column 41 upside down. Accordingly, the assembling work of the support member 8C is facilitated.

[Third Modification]

Figure 17:
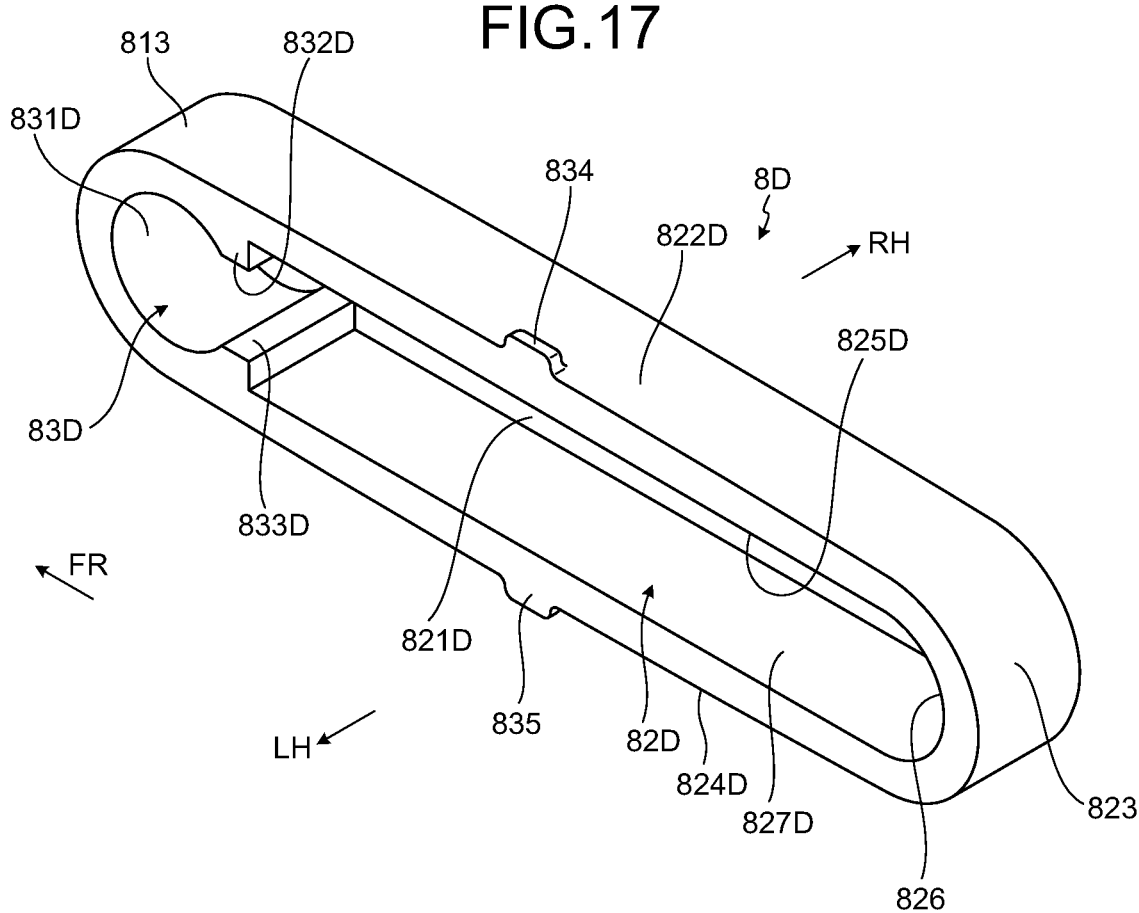
FIG. 17 is a perspective diagram of a support member according to a third modification.
Figure 18:
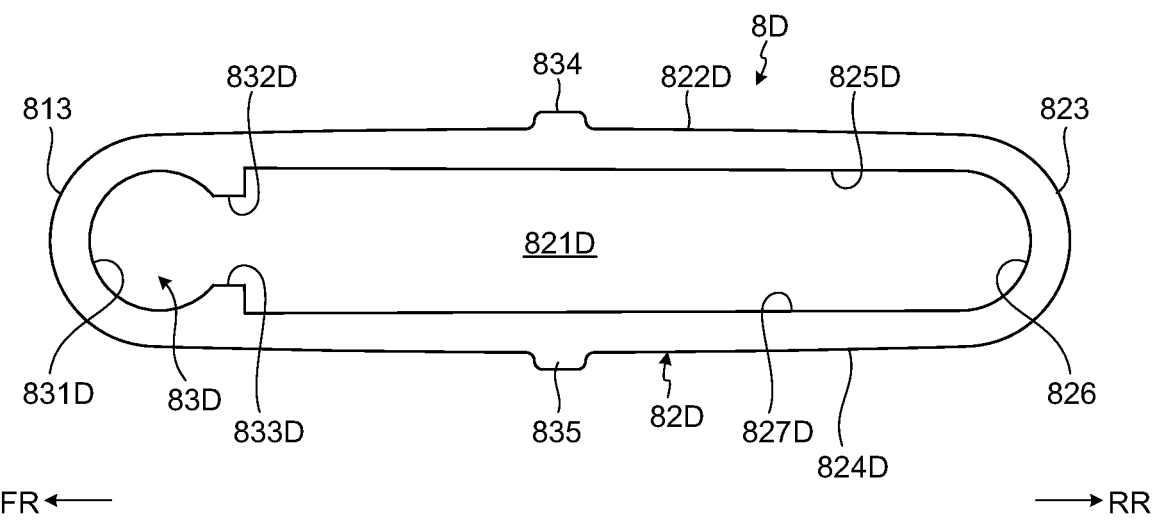
FIG. 18 is a side diagram of FIG. 17.

Next, a support member according to a third modification will be described. FIG. 17 is a perspective diagram of the support member according to the third modification. FIG. 18 is a side diagram of FIG. 17.

As illustrated in FIGS. 17 and 18, a support member 8D is a bracket extending long in the axial direction. Note that although the support member 8D is disposed on the left side of the vehicle body, the support member 8D disposed on the right side of the vehicle body also has the same structure.

A through-hole 83D penetrates the support member 8D in the left-right direction. Specifically, an inner peripheral surface 831D of the through-hole 83D has an arc shape when viewed from the side. The shaft portion 712 of the tilt bolt 71 penetrates through the through-hole 83D.

A second portion 82D is a frame-shaped member and has a long hole 821D penetrating in the left-right direction. An upper surface 822D and a lower surface 824D of the second portion 82D are flat. A rear end surface 823 has an arc shape when viewed from the side. In addition, the edge of the long hole 821D includes an upper surface 825D, a lower surface 827D, and a rear end surface 826. The upper surface 825D and the lower surface 827D are flat. The rear end surface 826 has an arc shape when viewed from the side. That is, the upper surface 822D and the upper surface 825D extend parallel to each other, and the lower surface 824D and the lower surface 827D extend parallel to each other. In addition, the rear end surface 823 and the rear end surface 826 are concentric arcs.

The through-hole 83D communicates with the long hole 821D. In other words, the long hole 821D extends rearward from the through-hole 83D, that is, toward the steering wheel 2. Protrusions 832D and 833D that support the tilt bolt 71 are disposed between the through-hole 83D and the long hole 821D. The protrusion 832D and the protrusion 833D are stoppers for holding the tilt bolt 71 in the through-hole 83D.

As described above, also in the third modification, the support member 8D includes the through-hole 83D through which the tilt bolt 71 penetrates, the long hole 821D, and the protrusions 832D and 833D. Accordingly, the forward movement amount of the tilt bracket (column bracket) 6 is reduced by the distance over which the tilt bolt 71 moves in the long hole 821D of the support member 8D at the time of the secondary collision. In addition, since the through-hole 83D is disposed at the end portion on the front side of the support member 8C, the distance of the long hole 821D is longer than that of the support member 8 according to the embodiment. Accordingly, the forward movement amount of the tilt bracket (column bracket) 6 is further reduced since the distance over which the tilt bolt 71 moves in the long hole 821D of the support member 8D becomes longer at the time of the secondary collision.

[Fourth Modification]

Figure 19:
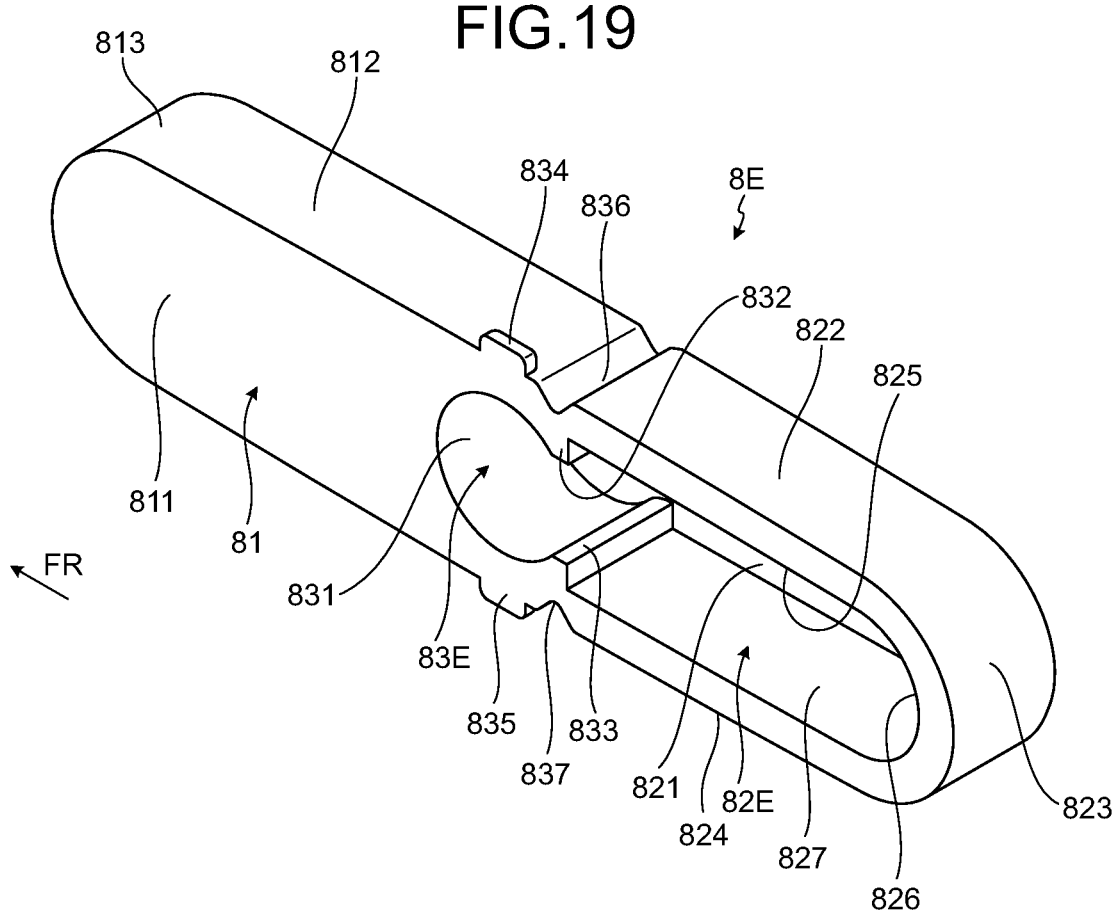
FIG. 19 is a perspective diagram of a support member according to a fourth modification.
Figure 20:
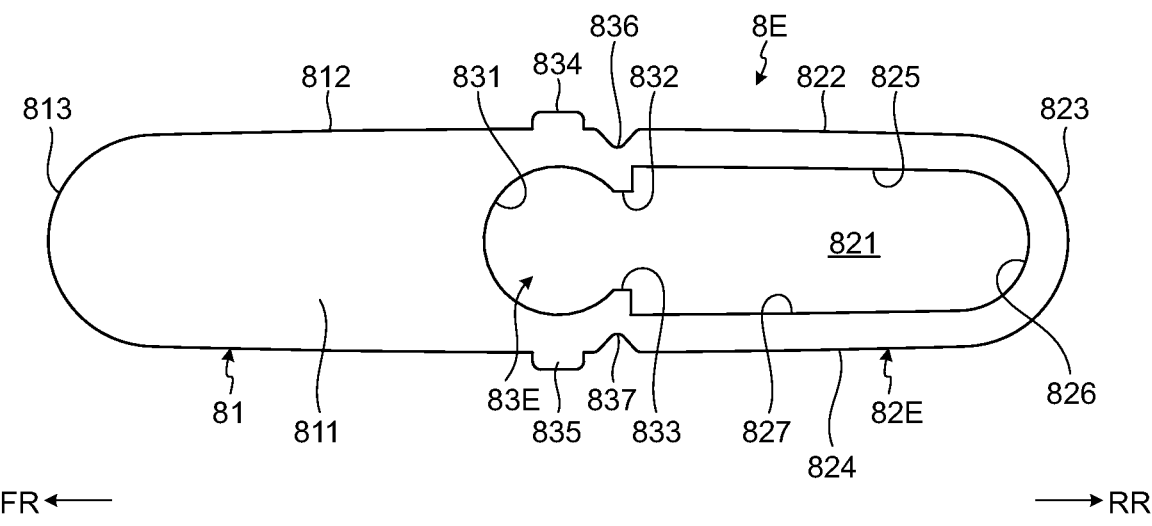
FIG. 20 is a side diagram of FIG. 19.

Next, a support member according to a fourth modification will be described. FIG. 19 is a perspective diagram of the support member according to the fourth modification. FIG. 20 is a side diagram of FIG. 19.

As illustrated in FIGS. 19 and 20, a support member 8E is a bracket extending long in the axial direction. Note that although the support member BE is disposed on the left side of the vehicle body, the support member 8E disposed on the right side of the vehicle body also has the same structure.

Since the support member BE has substantially the same structure as the support member 8 according to the first embodiment, only different portions will be described. The support member 8E includes a first portion 81 on the front side, a second portion 82E on the rear side, and a through-hole 83E provided at a central portion in the front-rear direction. The support member BE is different from the support member 8 in that recesses 836 and 837 are provided. As illustrated in FIG. 20, the recess 836 has a V-shape in a side view and is a recess recessed downward. The recess 837 has an inverted V-shape in a side view and is a recess recessed upward. The recesses 836 and 837 are provided at substantially the same positions as the front and rear positions of the protrusions 832 and 833.

As described above, also in the fourth modification, the support member 8E includes the through-hole 83E through which the tilt bolt 71 penetrates, the long hole 821, and the protrusions 832 and 833. Accordingly, the forward movement amount of the tilt bracket (column bracket) 6 is reduced by the distance over which the tilt bolt 71 moves in the long hole 821 of the support member 8 at the time of the secondary collision. In addition, since the support member 8E has the recesses 836 and 837, the protrusions 832 and 833 are easily bent when the tilt bolt 71 gets over the protrusions 832 and 833. Accordingly, a variation in load when the tilt bolt 71 moves to get over the protrusions 832 and 833 is reduced, and the load in getting over is stabilized. Accordingly, the relative movement of the tilt bolt 71 with respect to the support member 8E becomes smooth.

[Fifth Modification]

Figure 21:
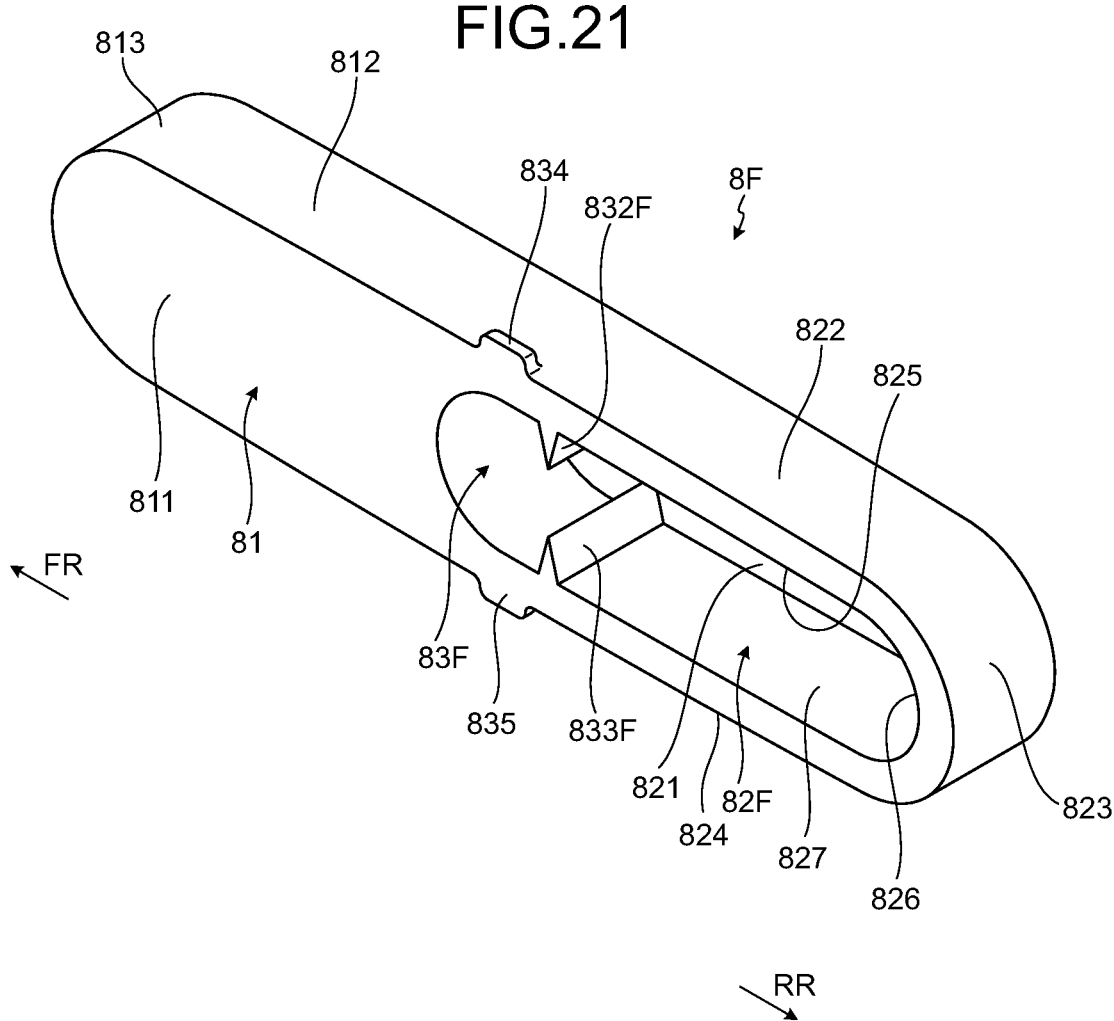
FIG. 21 is a perspective diagram of a support member according to a fifth modification.
Figure 22:
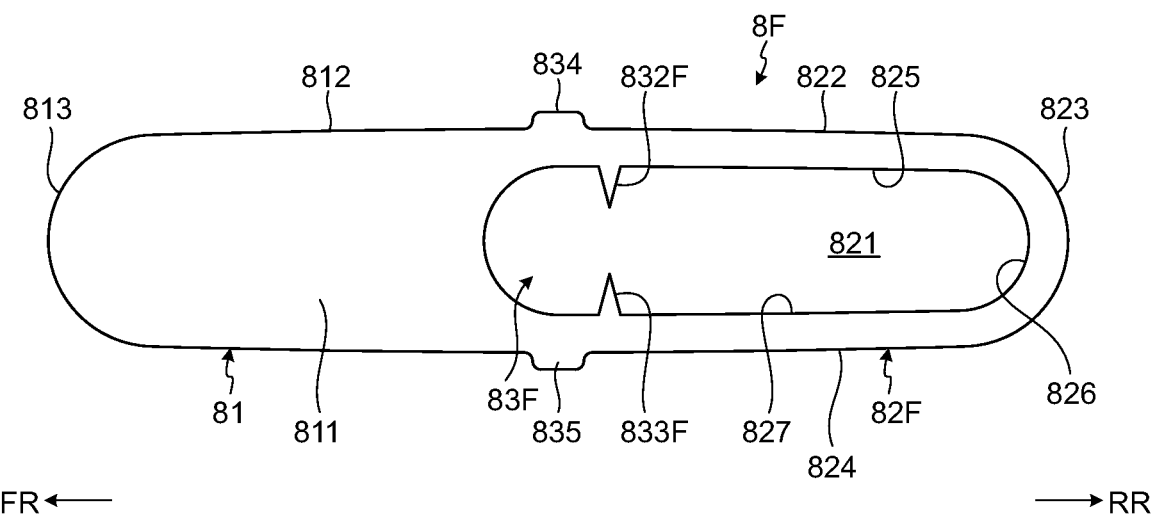
FIG. 22 is a side diagram of FIG. 21.

Next, a support member according to a fifth modification will be described. FIG. 21 is a perspective diagram of the support member according to the fifth modification. FIG. 22 is a side diagram of FIG. 21.

As illustrated in FIGS. 21 and 22, a support member 8F is a bracket extending long in the axial direction. Note that although the support member 8F is disposed on the left side of the vehicle body, the support member 8F disposed on the right side of the vehicle body also has the same structure.

Since the support member 8F has substantially the same structure as the support member 8 according to the first embodiment, only different portions will be described. The support member 8F includes a first portion 81 on the front side, a second portion 82F on the rear side, and a through-hole 83F provided at a central portion in the front-rear direction. The support member 8F is different from the support member 8 in the shapes of protrusions 832F and 833F. As illustrated in FIG. 22, the protrusion 832F has a sharp triangular shape in a side view. The protrusion 832F extends downward. The protrusion 833F has a sharp triangular shape in a side view. The protrusion 833F extends upward.

As described above, also in the fifth modification, the support member 8F includes the through-hole 83F through which the tilt bolt 71 penetrates, the long hole 821, and the protrusions 832F and 833F. Accordingly, the forward movement amount of the tilt bracket (column bracket) 6 is reduced by the distance over which the tilt bolt 71 moves in the long hole 821 of the support member 8 at the time of the secondary collision. In addition, the protrusions 832F and 833F have a sharp triangular shape in a side view. For this reason, since the protrusions 832F and 833F are easily damaged when the tilt bolt 71 moves, an impact is hardly received from the protrusions 832F and 833F when the tilt bolt 71 moves, and the relative movement of the tilt bolt 71 with respect to the support member 8F becomes smooth.

REFERENCE SIGNS LIST

1 STEERING DEVICE
2 STEERING WHEEL
3 STEERING SHAFT
31 UPPER SHAFT (INPUT SHAFT)
32 LOWER SHAFT (OUTPUT SHAFT)
4 STEERING COLUMN
41 UPPER COLUMN
410 LEG PORTION
411 COLUMN LONG HOLE
42 LOWER COLUMN
5 GEAR BOX
51 ECU
52 ELECTRIC MOTOR
6 TILT BRACKET (COLUMN BRACKET)
61 TOP PLATE PORTION
611, 612 NOTCH
613, 614 DETACHMENT CAPSULE 613a, 614a REAR END
615, 616 THROUGH-HOLE
62, 63 SIDE PLATE PORTION
621, 631 TILT LONG HOLE
64 VERTICAL PLATE
7 TILT MECHANISM
70 OPERATION LEVER
701 BASE PORTION
702 INSERTION HOLE
703 LEVER PORTION
71 TILT BOLT (PIN)
711 HEAD PORTION
712 SHAFT PORTION
713 SCREW PORTION
74 CAM
741 ROTATION CAM
742 FIXED CAM
751 NUT
752 THRUST BEARING
753 WASHER
8, 8A, 8B, 8C, 8D, 8E, 8F SUPPORT MEMBER
81, 81B, 81C FIRST PORTION
811 SIDE SURFACE
811B, 811C THROUGH-HOLE
812 UPPER SURFACE
813 FRONT END SURFACE
814 LOWER SURFACE
815B, 815C UPPER SURFACE
816B, 816C FRONT END SURFACE
817B, 817C LOWER SURFACE
818C REAR END SURFACE
82, 82A, 82C, 82D, 82E, 82F SECOND PORTION
821, 821C, 821D LONG HOLE
821A SIDE SURFACE
822, 822D UPPER SURFACE
823 REAR END SURFACE
824, 824D LOWER SURFACE
825, 825D UPPER SURFACE
826 REAR END SURFACE
827, 827D LOWER SURFACE
83, 83B, 83C, 83D, 83E, 83F THROUGH-HOLE
831, 831B, 831C, 831D INNER PERIPHERAL SURFACE
832, 832D, 832F, 833, 833D, 833F PROTRUSION (STOPPER)
832C STOPPER PORTION (STOPPER)
834, 835 PROTRUDING PORTION
836, 837 RECESS
839B INNER PERIPHERAL SURFACE
100 VEHICLE BODY

The invention claimed is:

1. A steering device not having a telescopic function, comprising:
   a steering shaft that is coupled to a steering wheel and extends in an axial direction;
   an upper column having a cylindrical shape that is disposed on a radially outer side of the steering shaft;
   a lower column having a cylindrical shape that is fitted to the upper column and is capable of relatively moving in an axial direction with respect to the upper column;
   a column bracket that includes a side plate portion located on a side of the upper column and is detachable from a vehicle body at a time of collision;
   a support member that is provided on the upper column; and
   a pin that extends along a vehicle width direction and penetrates the side plate portion and the support member, wherein
   the support member includes a through-hole through which the pin penetrates, a long hole extending from the through-hole toward the steering wheel, and a stopper positioned between the through-hole and the long hole, and
   the pin hits the stopper at a time of collision, and the stopper is deformed, so that the pin is movable from the through-hole to the long hole.

2. The steering device according to claim 1, wherein the upper column includes a column long hole extending along an axial direction, and
   the support member is attached to the column long hole.

3. The steering device according to claim 2, wherein the support member is detachably provided on the upper column.

4. The steering device according to claim 1, wherein the stopper is a protrusion.

5. The steering device according to claim 1, wherein the side plate portion includes a tilt long hole extending in a direction intersecting an extending direction of the long hole, and
   the pin penetrates the tilt long hole.

* * * * *